United States Patent [19]

Budnik et al.

[11] Patent Number: 5,041,468

[45] Date of Patent: Aug. 20, 1991

[54] PROCESSES FOR PREPARING SILICONE SURFACTANTS CONTAINING CYCLIC SILOXANE PENDANTS, AND POLYURETHANE FOAM USING SUCH SURFACTANTS

[75] Inventors: Richard A. Budnik, Mount Kisco; Gerald J. Murphy, Wappingers Falls, both of N.Y.

[73] Assignee: Union Carbide Chemicals & Plastics Technology Corporation, Danbury, Conn.

[21] Appl. No.: 355,317

[22] Filed: May 23, 1989

Related U.S. Application Data

[62] Division of Ser. No. 165,537, Mar. 8, 1988, Pat. No. 4,855,379.

[51] Int. Cl.$^5$ .......................... C08J 9/00; C08G 77/44
[52] U.S. Cl. ..................................... 521/112; 525/478; 528/29; 528/31; 528/32; 528/37; 556/445
[58] Field of Search ..................... 528/29, 31, 32, 37; 556/445; 525/478; 521/112

[56] References Cited

U.S. PATENT DOCUMENTS

| | | | |
|---|---|---|---|
| B 503,776 | 3/1976 | Prokai et al. | 106/316 |
| 3,423,236 | 1/1969 | Quaal | 528/32 |
| 3,438,936 | 4/1969 | Lamoreaux | 260/46.5 |
| 4,018,723 | 4/1977 | Kanner et al. | 528/28 |
| 4,042,643 | 8/1977 | Creasey et al. | 528/31 |
| 4,071,483 | 1/1978 | Litteral et al. | 260/2.5 |
| 4,136,239 | 1/1979 | Rossmy | 521/111 |
| 4,283,519 | 8/1981 | Pines et al. | 528/26 |
| 4,309,508 | 1/1982 | Baskent et al. | 521/112 |
| 4,616,076 | 10/1986 | Ona et al. | 528/15 |

FOREIGN PATENT DOCUMENTS 0183533 11/1985 European Pat. Off. .
1469072 12/1965 France .

*Primary Examiner*—John C. Bleutge
*Assistant Examiner*—R. Dean, Jr.
*Attorney, Agent, or Firm*—William F. Gray

[57] ABSTRACT

Novel siloxane-polyether polymers are provided containing cyclic siloxanes which are useful in silicone surfactants for foam polyurethane foam applications. The novel polymers are prepared by reacting a polyhydridosiloxane polymer with a cyclic polysiloxane containing a vinyl group and with an allyl started polyoxyalkylene polymer in the presence of a platinum catalyst. The resulting polymeric products are highly potent and impart flat breathability profiles to foams when used as surfactants in their preparation.

17 Claims, No Drawings

PROCESSES FOR PREPARING SILICONE SURFACTANTS CONTAINING CYCLIC SILOXANE PENDANTS, AND POLYURETHANE FOAM USING SUCH SURFACTANTS

This application is a division of prior U.S. application Ser. No. 165537 filed Mar. 8, 1988, now U.S. Pat. No. 4,855,379.

FIELD OF THE INVENTION

This invention relates in general to a new class of siloxane-polyether polymers containing cyclic siloxanes and to silicone surfactants containing cyclic siloxane pendants. In one aspect, this invention is directed to silicone surfactants, a process for their preparation, their use in the preparation of polyether polyurethane foams and the foams prepared therefrom.

THE INVENTION

Prior to the present invention a wide variety of silicone surfactants has been reported in the literature for use in the preparation of flexible polyureathane foams. However, the currently used flexible foam surfactants derived from either hydrolyzable or non-hydrolyzable technology typically do not offer both high potency and flat foam breathability profiles in the same polymeric product.

Improving the potency of the surfactant is, of course, desirable from a performance standpoint since equivalent foam properties can be obtained using less of the costly surfactant. Surfactants which give flat foam breathability profiles are desired since a customer should have the option to change the amount of a surfactant without drastically changing the breathability of the final foam product. While some surfactants impart excellent potency to foams they suffer from a significant drop in the foam's breathability profile as the surfactant level is increased. In contrast, other surfactants may give a flatter breathability profile but are less potent. The typical non-hydrolyzable silicone surfactant structures utilized today represent a trade-off between high potency and flatness of the foam's breathability profile.

It has been also observed that none of the siloxane compositions disclosed to date in the literature for use as flexible foam surfactants has pendant cyclic siloxane rings which are attached to the siloxane backbone through Si—CH$_2$CH$_2$—Si— linkages. It has been noted that polymers containing this particular molecular configuration provide excellent surfactants which possess the ability to impart both potency and flat breathability profiles to flexible ureathane foams. Accordingly, it is possible to use a lesser amount of the surfactant with the accompanying economic advantages in the preparation of such flexible foams.

U.S. Pat. No. 2,834,748 which issued May 13, 1958 to F. Bailey and which is assigned to Union Carbide Corporation, is directed to the general area of hydrolyzable silicone surfactants and discloses and claims compositions of hydrolyzable siloxane-oxyalkylene block copolymers. These hydrolyzable structures however, contain Si—O—C linkages at the attachment point of the polyether pendant to the silicone backbone.

In Japanese patent 50/4199 which issued in 1975 to Shin-Etsu, a terpolymer is disclosed which was prepared with a siloxane backbone having pendant oxyalkylene and siloxane groups. The adducts disclosed in this patent, however, do not contain any pendant cyclic siloxanes. Moreover, when such terpolymers were tested under the conditions set forth in the present invention, they failed to stabilize polyurethane foams and exhibited poor performance characteristics.

Cyclic siloxane rings have been incorporated into the siloxane backbone of siloxane chains. One example described in the literature is an article by Mukbaniani, Chem. Abstracts 104: 207800x, in which a dimethylsiloxane chain is disclosed containing regularly occurring organocyclopentasiloxane units. Structures containing a T unit (MeSiO$_{3/2}$) may loop back to the T to form a cyclic siloxane fragment at the end of the siloxane chain. In both of these types of structures the cyclic siloxane ring is attached to the backbone through Si—O—Si linkages and not through Si—CH$_2$—CH$_2$—Si linkages.

Cyclic siloxane rings have also been used as side chains in polydimethylsiloxane polymers. A Russian article by Esartiya in Chem Abstracts, 105: 153620p discloses polysiloxane structures where cyclic siloxane rings containing one T unit (MeSiO$_{32}$) per ring are attached to a siloxane backbone through Q (SiO$_{4/2}$) linkages to the T unit of the ring. These structures are very different from the instant invention in the manner the siloxane is attached to the backbone and in the composition of the ring siloxanes. The instant invention incorporates only D units instead of T units in the siloxane ring pendants and the rings are attached to the backbone through Si—CH$_2$—CH$_2$—Si linkages instead of the Si—O—Si linkages of the prior art polymers.

In Japanese patent 58/58519, 1983 which issued to Nihon Contact Lens Seizo K.K. there is described a block copolymer containing a siloxane backbone with both allyl polyethylene glycol pendants and linear siloxane pendants. The block coploymer is used for contact lens. In this case the siloxane pendant is based on a silicone resin of the structure CH$_2$=CHSiMe$_2$-(OSiMe$_2$)$_n$OSiMe$_2$CH=CH$_2$ where n is an intergral number. This resin contains two vinyl groups which are capable of reacting with two different Si—H sites on the same or on different siloxane chains. Thus, this resin is capable of serving as a crosslinker between two siloxane chains.

Accordingly, one or more of the following objects will be achieved by the practice of the present invention. It is an object of this invention to provide novel siloxane polyether polymers containing pendant cyclic siloxane groups. Another object of the present invention is to provide polymers having pendant cyclic siloxane groups which are attached to a siloxane backbone through Si—CH$_2$—CH$_2$—Si linkages. A further object of this invention is to provide certain siloxane polyether surfactants which are useful in the preparation of polyurethane foams. Another object of this invention is to provide a process for the preparation of the siloxane polyether polymers and their use as surfactants in the preparation of foams. A further object is to provide surfactants which can impart to foams both high potency and flat breathability properties and accordingly can be employed in lesser amounts than known surfactants currently available. These and other objects will readily become apparent to those skilled in the art in the light of the teachings herein set forth.

SUMMARY OF THE INVENTION

In its broad aspect, this invention is directed to the preparation of silicone surfactants containing cyclic siloxane pendants and their use in the preparation of polyurethane foams. The invention also relates to the synthesis of a new class of siloxane-polyether polymers containing cyclic siloxanes, a method for their preparation, and their use in preparing the silicone surfactants.

The silicone surfactants of this invention are comprised of siloxane-polyether polymers having a plurality of pendant cyclic siloxane groups attached to the siloxane backbone of the polymers through Si—CH$_2$—CH$_2$—Si linkages, and are prepared by a process comprising the steps of:

(a) forming a mixture in an inert medium and under an inert atmosphere, of a polyhydridosiloxane polymer product of the formula:

MD'$_x$D$_y$M wherein:
M represents Me$_3$SiO$_{1/2}$,
D' represents MeSi(H)O,
D represents Me$_2$SiO,
x has a value of 2 to 200, and
y has a value of 0 to 200,
with a vinylpolymethyl cyclic polysiloxane compound, (b) heating the mixture to a temperature of from about 50° to about 120° C., preferably from about 65° to about 95° C., (c) contacting the mixture with a catalytic amount of a hydrosilation catalyst;

(d) contacting the mixture with a polyether fluid having a blend average molecular weight of from about 1000 to about 4000, preferably from about 1000 to about 2700, and (e) after most of the SiH has reacted, adding an excess of the polyether.

Also encompassed by the present invention are the intermediate polyhydridosiloxane polymers used in the preparation of the these silicone surfactants containing cyclic siloxane pendants and the process for their preparation.

DETAILED DESCRIPTION OF THE INVENTION

When used as silicone surfactants in polyurethane foam formulations the polymers of the present invention exhibit unexpected performance advantages over conventional polysilicon-polyoxyalkylene copolymers. Foams prepared using the polymers of this invention showed a flatter air flow (breathability) response than conventional surfactants over a wide range of surfactant concentrations. Use of the polymers resulted in greater heights of foam rise than using conventional surfactants used in the same concentration. The polymers also gave better foam performance than conventional surfactants having polymer structures with higher per cent silicone content. The ability to use a lower per cent silicone surfactant represents a significant cost advantage since the silicone portion of the polymer is more expensive than the organic portion.

It has been observed that changes in surfactant structure can impart dramatic changes in the flatness of the breathability profile without significantly changing surfactant potency. As indicated previously, this feature offers a unique advantage over conventional surfactants where potency must often be sacrificed to achieve flatter breathability. From an analysis of the foam testing data, it has also been observed that the surfactant potency decreases in the following order: cyclic->linear>branched.

In practice, the silicone surfactants, the intermediate polyhydridosiloxane polymers and the foams prepared from the surfactants are conveniently prepared by the methods disclosed in the examples.

In accordance with the teachings of the present invention silicone surfactants containing cyclic siloxane pendants can be prepared having the following formulas:

MD$_a$D$^o$$_b$D''$_c$M and

MD$^o$$_b$D''$_c$M wherein:
M represents Me$_3$SiO$_{1/2}$,
D represents Me$_2$SiO,
D$^o$ represents $$\overline{\text{MeSi(O)CH}_2\text{CH}_2\text{Si(Me)O}-(\text{Me}_2\text{SiO})_x},$$

where x=2 to 4,
D'' represents MeSi(O)CH$_2$CH$_2$CH$_2$—O—Polyether, in which a has a value of from 0 to 200, b has a value of from 1 to 200 and c has a value of from 1 to 200. The surfactants themselves are prepared from the polyhydridosiloxane polymers of the respective formulas:

MD'$_x$M and

MD'$_x$D$_y$M wherein M, D and D' are as previously indicated, y has a value of from 0 to 200 and x has a value of from 2 to 200.

These intermediates are in turn prepared by the reaction of an alkyldisiloxane with a polyhydridosiloxane polymer, and in some cases an alkylcyclosiloxane, particularly octamethycyclo tetrasiloxane, in the presence of a strong acid, such as sulfuric acid. The surfactants are prepared from the reaction of these intermediates with the cyclic siloxane and the polyether. Preparation of the polyhydridosiloxane polymers is shown in Examples 4 and 5.

The cyclic siloxanes were prepared as indicated in Examples 1 and 2 from readily available starting materials.

The polyethers used in the preparation of the surfactants of this invention were a binary mixture of two acetoxy encapped fluids with a blend average molecular weight of 2342. These polyethers are more fully described in U.S. Pat. No. 4,025,456, the subject matter of which is incorporated herein by reference. It is understood that end caps other than acetoxy may be embodied in this invention. These include hydroxy, alkoxy, acetals and carbamates.

Synthesis of the surfactants is effected in an inert organic medium such as toluene and in the presence of a hydrosilation catalyst such as chloroplatinic acid.

It has been observed that the addition sequence of the reactants during the hydrosilation reaction is important in order to prepare a surfactant which will impart the desire properties to the polyurethane foam. Thus during the addition, the vinyl polymethyl cyclic siloxane is added first, followed by the allylpolyoxyalkylene and then, after most of the SiH has been consumed, the excess polyether is added.

The silicone surfactants containing cyclic siloxane pendants prepared in accordance with the teachings of this invention are particularly useful and have been found to be excellent and efficient surfactants for the preparation of flexible polyether polyurethane foams. It has been found that the surfactants of this invention provide improved levels of performance particularly in imparting to such foams high potency and flat breathability characteristics.

In producing the polyurethane foams using the surfactants of this invention, one or more polyether polyols is employed for reaction with a polyisocyanate reactant to provide the urethane linkage. Such polyols have an average of at least 2 and typically.2.0 to 3.5 hydroxyl groups per molecule and include compounds which consist of carbon, hydrogen and oxygen, and compounds which may also contain phosphorus, halogen, and/or nitrogen. Such polyether polyols are well know in the art and are commercially available.

The organic polyisocyanates that are useful in producing polyether polyurethane foams in accordance with the teachings of this invention are also well known in the art and are organic compounds that contain at least two isocyanate groups and any such compounds or mixtures thereof can be employed. The toluene diisocyanates are among many suitable isocyanates which are commercially used in the preparation of polyurethane foams.

The urethane foaming reaction is usually effected in the presence of a minor amount of a catalyst, preferably an amine catalyst and usually a tertiary amine.

It is also preferred to include a minor amount of certain metal catalysts in addition to the amine catalyst in the component of the reaction mixture. Such supplementary catalysts are well known to the art of polyether-based polyurethane foam manufacture. For example, useful metal catalysts include organic derivatives of tin, particularly tin compounds of isocyanate generates carbon dioxide in situ, or through the use of blowing agents which are vaporized by the exotherm of the reaction or by a combination of the two. These methods are well known in the art.

The polyether-based polyurethane foams, of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol and catalyst components.

It is understood that the relative amounts of the various components of the foam formulation are not narrowly critical. The polyether polyol and polyisocyanate are present in the foam-producing formulation in a major amount. The relative amounts of these two components in the amount required to produce the desired urethane structure of the foam and such relative amounts are well known in the art. The blowing agent, catalyst and surfactant are each present in a minor amount sufficient to foam the reaction mixture, the catalyst is present in a catalytic amount i.e., that amount necessary to catalyze the reaction to produce the urethane at a reasonable rate, and the surfactant is present in an amount sufficient to impart the properties desired.

The polyurethanes produced in accordance with the present invention can be used in the same areas as conventional polyether polyurethanes. For example, the foams of the present invention can be used with advantage in the manufacture of textile interliners, cushions, mattresses, padding, carpet underlay, packaging, gaskets, sealers, thermal insulators and the like.

In the examples which follow, all reactions involving the manipulation of organometallic compounds were performed in a inert atmosphere. Commercial reagents were used without additional purification. All glassware was washed successively with KOH/ethanol, water, dilute hydrochloric acid and water and oven dried before use. IR spectra were recorded on a Beckman Acculab 4 spectrophotomer. $^{13}$C NMR spectra were obtained using a Varian CFT-20 spectrophotometer with fourier transform capabilities. $^{29}$Si NMR and additional $^{13}$C NMR spectra were obtained using a JEOL-90Q spectrometer. NMR samples were prepared by dissolving the samples in either deuterochloroform or perdeuterobenzene containing 0.03 M Cr(acac)$_3$ relaxation agent. GC analysis were obtained using a Hewlett Packard Model 5840A gas chromatograph fitted with 10 ft. ×⅛ in stainless steel columns packed with OV101 on Chromosorb W. The GC was temperature programmed from 75° C. to 350° C. at a rate of 10° C./min with an initial temperature hold of 1 minute and a post hold of 20 minutes using a helium carrier gas flow of 30 cc/min.

The following examples are illustrative of the present invention:

EXAMPLE 1

Synthesis of Vinylheptamethylcyclotetrasiloxane, D$_3$D* Vinyl

A three liter three neck round bottom flask fitted with a mechanical stirrer, a thermometer attached to a ThermoWatch regulator and a reflux condenser under positive argon atmosphere was charged with hexamethylcyclotrisiloxane(herein referred to as cyclic D$_3$, 1001 g (4.5 mol), and methylvinyldichlorosilane, 634.5 g (4.5 mol). The reaction mixture was heated to 60° C. and then hexamethylphosphorous triamide, (HMPA), 0.82 g (500 ppm) was added as a catalyst via syringe to afford a detectable exotherm and form the expected linear dichlorosiloxane as an intermediate product.

A portion of the intermediate dichlorosiloxane solution, 600 ml. was added dropwise to a stirred mixture of isopropyl ether, 600 ml, and distilled water, 300 ml. The water/HCl layer was allowed to settle out and was drawn off from the bottom of the reaction flask. A fresh charge of water was added and the remainder of the dichlorosiloxane intermediate was added to the flask. After removal of the water layer the silicone layer was treated with an aqueous solution of sodium bicarbonate (7%), 300 ml. After separation of the layers the crude product was then washed with an additional 300 ml of distilled water. GPC showed a major product eluting at 8.25 min. The crude product was distilled in vacuo. The fractions having a boiling point range from 52°-66° C. at 117 mm Hg were combined to give as product a mixture (93% yield) of D$_3$D* vinyl and D$_2$D* vinyl in an 89/11 ratio.

Characteristic $^{29}$Si NMR assignments (ppm, benzene-d$_6$+Cr(acac)$_3$: D$_3$D* vinyl, −19.13, −18.72, 9.13; D$_3$D* vinyl, −33.6; D$_2$D* vinyl, −8.09; D$_2$D* vinyl, −23. Characteristic $^{13}$C NMR assignments (ppm, CDCl$_3$+Cr(acac)$_3$): CH$_2$=CHSi, 132.7; CH$_2$=CHSi, 136.4; vinylSiCH$_3$, −1.05; (CH$_3$)$_2$Si, 0.9. D$_3$D* vinyl and D$_2$D* vinyl can not be distinguished by $^{13}$C NMR.

EXAMPLE 2

Synthesis of Vinylnonamethylpentasiloxane D$_4$D* Vinyl

A two liter three necked round bottomed flask fitted with a magnetic stirring bar, a thermometer attached to a ThermoWatch regulator and a reflux condenser under positive argon atmosphere was charged with octamethylcyclotetrasiloxane (hereinafter referred to as cyclic D$_4$), 888 g (3 mol), methylvinyldichlorosilane, 282 g (2 mol) and hexamethylphosphorous triamide (HMPA), 1.17 g. the mixture was heated to 100° C. The reaction progress was monitored by periodically removing aliquots for gas chromatographic analysis. The diclorosiloxane intermediate eluted with a retention time of 13.7 min vs cyclic D$_4$ at 7.2 min and methylvinyldichlorosilane at 1.85 min using an 10 ft3 ⅛ in OV-101 column with the temperature programmed from 75° C. (2 min prehold) to 300° C. (20 min posthold) at a rate of 10° C./min using a helium carrier flow rate of 30 cc/min. To increase the reaction rate the temperature was increased to 130° C.; an additional 0.6 g of HMPA was added followed by the addition of triphenylphosphine oxide, 10 g. in acetonitrile, 100 g. After three additional hours gc analysis showed only a trace of unreacted methylvinyldichlorolsilane remaining.

Isopropylether, 450 ml and distilled water, 250 ml, were added to a five liter three necked round bottom flask containing a bottom drain. A portion of the intermediate dichlorosiloxane mixture, 500 ml, was added dropwise to the stirred mixture of isopropyl ether distilled water. The water/HCl layer was allowed to settle out and was drawn off from the bottom of the reaction flask. A fresh charge of water was added to the flask followed by the dropwise addition of an additional 500 ml of the dichlorosiloxane intermediate. The water /HCl layer was again drained and replaced with distilled water. After dropwise addition of another 400 ml of the dichlorosiloxane intermediate the water/HCl layer was drained and replace with distilled water. The final 350 ml of the dichlorosiloxane intermediate was then added dropwise After removal of the water layer the silicone layer was treated with an aqueous solution of sodium bicarbonate (7%), 300 ml. After separation of the layers the crude product was distilled in vacuo. The fractions having a boiling point range from 67°-68° C. at 0.5 mm Hg were combined to give the product, D$_4$D* vinyl, in a 21% overall yield.

EXAMPLE 3

Synthesis of Vinylnonamethyltetrasiloxane, MD$_2$M* vinyl

The following method was used to prepare MD$_2$M vinyl. A 500 ml three necked round bottom flask was fitted with a condenser under positive argon, a magnetic stir bar, a thermometer connected to a ThermoWatch sensor and power regulator, and an addition funnel. The flask was charged with hexamethylcyclotrisiloxane, D$_3$, 41,37 g (0.186 mol), and chlorodimethylvinylsilane, 22.44 g (0.186 mol). the resulting mixture was heated to 60° C. and hexamethylphosphorous triamide, 0.15 g (500 ppm) was added. Monitoring of the reaction by GPC showed the disappearance of the chlorodimethylvinylsilane. The reaction mixture was cooled in an ice bath and a solution of methyllithium, 1.4 M in diethylether, 133.28 ml (0.186 mol), was added dropwise over a period of 1.5 hrs. After two additional hours the reaction mixture was warmed to room temperature. The mixture was filtered and the ether was removed in vacuo. The crude product was distilled at 0.5 mm Hg bp=48°-52° C. to give the product as a colorless liquid, 23.4 g (40% distilled yield).

$^1$H NMR assignments (ppm, benzene-D$_6$+Cr(acac)3): 5.4, 3 H, complex pentet, vinyl H's; −0.5, 27 H, broad singlet, methyls. $^{13}$C NMR assignments (ppm, benzene-D6+Cr(acac)$_3$, gated decoupled spectra): 131.73, 1 C, doublet of triplets, $J_{c-H}$= 157.7 Hz, $J_{CCH}$=11.4 Hz, H$_2$C=CHSi; 139.57, 1 C, broad doublet, JCH=141.4Hz, H$_2$C=CHSi; 0.42, 1 C, quartet, $J_{CH}$=118.4 Hz, H$_2$C=CHSi(CH$_3$); 1.30, 2 C. quartet, $J_{CH}$=117.7 Hz, vinylSiOSi(CH$_3$)$_2$; 1.30, 2 C. quartet, $J_{CH}$=117.7 Hz,, vinylSiOSiOSi(CH$_3$)$_2$; 1.93, 3 C. quartet, $J_{CH}$=117.5 H, (CH$_3$)$_3$Si.

EXAMPLE 4

Synthesis of Polyhydridosiloxane Polymers, MD'$_x$M

A two liter three neck round bottom flask fitted with a condenser under positive nitrogen and a magnetic stirring bar was charged with hexamethyldisiloxane (herein referred to as MM), 102.63 g (0.632 mol), a polyhydridosiloxane polymer (herein referred to as L-31) with an SiH content of 354.88 cc H2/ g having the average formula MD'$_{54.7}$M, 1256.33 g (0.368 mol) and concentrated sulfuric acid, 20.4 g (1.5 wt %). The reaction mixture was stirred about fourteen hours at room temperature until the silicone fluid was fully equilibrated. Samples were taken periodically from the reaction mixture and analyzed by gas chromatography to determine the extent of equilibration. The sulfuric acid puddle was replaced with fresh sulfuric acid if the equilibration was proceeding too slowly. After equilibration was achieved, the sulfuric acid puddle was removed and damp sodium bicarbonate, 75 g (10 wt % was added cautiously to the reaction mixture to neutralize the residual acid. After gas evolution ceased, the reaction mixture was filtered under pressure to yield the product, MD'$_{19.9}$M, as a clear colorless liquid, 1359 g (1.0 mol).

Following the above procedure the following polyhydrosiloxane polymers of formula MD'$_x$M were prepared using the following amounts of the polyhydridosiloxane polymer (L-31), hexamethyldisiloxane (MM) and sulfuric acid:

TABLE I

| PHSP # | x    | g L-31 | g MM  | g Acid |
|--------|------|--------|-------|--------|
| 1      | 19.9 | 1256.3 | 102.6 | 20.4   |
| 2      | 31.4 | 1982.4 | 68.1  | 30.8   |
| 3      | 27.5 | 1736.1 | 79.8  | 27.2   |
| 4      | 26.6 | 1679.3 | 82.5  | 26.4   |
| 5      | 25.9 | 1635.1 | 84.6  | 25.8   |
| 6      | 23.9 | 1508.9 | 90.6  | 24.0   |
| 7      | 21.9 | 1382.6 | 96.6  | 22.2   |
| 8      | 20.7 | 1306.8 | 100.2 | 21.1   |
| 9      | 19.1 | 1205.8 | 105.0 | 19.7   |
| 10     | 18.9 | 1193.2 | 105.6 | 19.5   |
| 11     | 17.9 | 1130.1 | 108.6 | 18.6   |
| 12     | 17.5 | 1104.8 | 109.8 | 18.2   |
| 13     | 15.9 | 1003.8 | 114.6 | 16.8   |
| 14     | 15.5 | 978.6  | 115.8 | 16.4   |

TABLE I-continued

| PHSP # | x | g L-31 | g MM | g Acid |
|---|---|---|---|---|
| 15 | 14.3 | 902.8 | 119.4 | 15.3 |
| 16 | 13.1 | 827.0 | 123.1 | 14.3 |
| 17 | 11.9 | 751.3 | 126.7 | 13.2 |
| 18 | 10.7 | 675.5 | 130.3 | 12.1 |

EXAMPLE 5

Synthesis of Polyhydridosiloxane Polymers, $MD_yD'_xM$

A one liter three neck round bottom flask fitted with a condenser under positive nitrogen and a magnetic stirring bar was charged with hexamethyldisiloxane (herein referred to as MM), 28.05 g (0.173 mol), a polyhydridosiloxane polymer (herein referred to as L-31) with an SiH content of 354.88 cc $H_2$/g having the average formula $MD'_{54.7}M$, 266,63 g (0.077 mol), $D_4$ cyclic tetramet, 277.50 g (0.937 mol), and concentrated sulfuric acid, 20.4 g (1.5 wt %). The reaction mixture was stirred for three hours at room temperature. The sulfuric acid puddle was removed and replaced with fresh sulfuric acid. After stirring overnight gc analysis showed the silicone fluid to be fully equilibrated. After equilibration was achieved, the sulfuric acid puddle was removed and damp sodium bicarbonate, 75 g (10 wt %), was added cautiously to the reaction mixture to neutalize the residual acid. After gas evolution ceased, the reaction mixture was filtered under pressure to yield a product, $MD_{15}D'_{16.9}M$, as a clear colorless liquid, 570 g (0.25 mol) hereafter referred to as PHSP #19.

Following the above procedure the polyhydridosiloxane polymer, $MD_{30}D'_{13.9}M$, 803 g (0.25 mol), hereafter referred to as PHSP #20 was prepared from the polyhydridosiloxane polymer (1-31), 219.17 g, hexamethyldisiloxane, 30.28 g and cyclic $D_4$ equilibrate, 555 g.

EXAMPLE 6

Synthesis of $MD_{15}D^o{}_{11.4}D''_{5.5}M$ Surfactant Where
$D^o = MeSi(O)CH_2CH_2$-cyclic $D_4$ and
$D^o = MeSi(O)(CH_2)_3$-Polyether-OAc.

A 250 ml three neck round bottom flask containing a magnetic stirrer bar was fitted with an addition funnel, a reflux condenser under positive argon atmosphere and a thermometer fitted with a sensor connected to a ThermoWatch power regulator. The flask was charged with the polyhydridosiloxane polymer product, PHSP #19, 19.9 g, toluene, 36.6 g (30 wt % of the total charge weight), and cyclic vinylheptamethylcyclotetrasiloxane (the product of Example 1), 14.11 g (herein referred to as D3D* vinyl). The stirred reaction solution was heated to 90° C. and then charged with an ethanol solution of chloroplatinic acid at a catalyst level (0.75 ml of a solution containing 10 mg of platinum per ml of ethanol solution corresponding to 0.01 % (100 ppm) Pt catalyst relative to the surfactant weight. Within one minute the temperature of the reaction mixture rose 16° C. After the reaction temperature began to fall (about five additional minutes) the polyether, 51.5 g was added in a stream through the addition funnel. The polyether used was a binary mixture of two acetoxy endcapped 40HA fluids with a blend average molecular weight of about 2342. This class of polyether mixtures is more fully described in U.S. Pat. No. 4,025,456. After stirring for 3 min, an aliquot was removed from the hydrosilylation reaction mixture and treated with aqueous KOH in ethanol to test for residual silane. Only a trace of residual silanic hydrogen was detected indicating near complete reaction had occurred. An excess of the polyether, 15.5 g, was added to insure complete reaction and afford an overall silicone content comparable to Control A. Toluene was removed from the crude product in vacuo (40° C. and 0.4 mm Hg) to yield the product, designated herein as a surfactant, as an amber clear liquid.

EXAMPLE 7

Synthesis of $MD^o{}_{14.4}D''_{5.5}M$ Surfactant Where
$D^o = MeSi(O)CH_2CH_2$-cyclic $D_4$ and
$D'' = MeSi(O)(CH_2)_3$-Polyether -OAc The procedure described in Example 6 was used to prepare the surfactant $MD_{30}D^0{}_{8.4}D''_{5.5}M$ from PHSP #20, 12.93 g, D3D* vinyl, 10.37 g, polyether, 51.5 g, and excess polyether, 15.51 g.

EXAMPLE 8

Synthesis of $MD^o{}_{14.4}D''_{5.5}M$ Surfactant Where
$D^o = MeSi(O)CH_2CH_2$-cyclic $D_4$ and
$D'' = MeSi(O)(CH_2)_3$-Polyether -OAc A 250 ml three neck round bottom flask containing a magnetic stirrer bar was fitted with an addition funnel, a reflux condenser under positive argon atmosphere and a thermometer fitted with a sensor connected to a ThermoWatch power regulator. The flask was charged with the polyhydridosiloxane polymer product, PHSP #1, 5.46 g, toluene, 36.6 g (30 wt % of the total charge weight), and cyclic vinylheptamethylcyclotetrasiloxane (the product of Example 1), 17.84 g (herein referred to as D3D* vinyl). The D3D* vinyl starting material contained 12 wt % $D_2D*$ vinyl as impurity. The stirred reaction solution was heated to 90° C. and then charged with an ethanol solution of chloroplatinic acid at a catalyst level (0.75 ml of a solution containing 10 mg of platinium per ml of ethanol solution) corresponding to 0.01% (100 ppm) Pt catalyst relative to the surfactant weight. Within one minute the temperature of the reaction mixture rose 15° C. After the reaction temperature began to fall (about three additional minutes) the polyether, 51.7 g was added in a stream through the addition funnel. The polyether used was a binary mixture of two acetoxy endcapped 40HA fluids with a blend average molecular weight of about 2342. This class of polyether mixtures is more fully described in U.S. Pat. No. 4,025,456. After stirring for 12 min, an aliquot was removed from the hydrosilylation reaction mixture and treated with aqueous KOH in ethanol to test for residual silane. Only a trace of residual silanic hydrogen was detected indicating near complete reaction had occurred. An excess of the polyether, 15.5 g, was added to insure complete reaction and afford an overall silicone content comparable to Control A. Toluene was removed from the crude product in vacuo (40° C. and 0.4 mm Hg) to yield the product, designated herein as a surfactant, as an amber clear liquid.

The surfactant was characterized by GPC, $^{13}C$ and $^{29}Si$ NMR spectroscopy. The $^{29}Si$ NMR showed a slight increase in the amount of T units ($MeSiO_{3/2}$) present over those present in the starting silane fluid. Characteristic $^{29}Si$ NMR assignments (ppm, benzene-$D_6$ +Cr(acac)$_3$): M, +10 to +7; vinyl $D_3D*$, −18.72, −19.13, −19.13; vinyl $D_3D*$, −33.6; vinyl $D_2D*$, −8.09; vinyl $D_2D*$, −23; $MD1_xM$, +9.8; $MD1_xM$, −34.7; T2, −59; T3, −64.7; cyclic $D_4$, −19; MeSi- (O)CH$_2$CH$_2$CH$_2$-polyether, $-21.8$; MeSi(O)CH$_2$CH$_2$-cyclic-D$_4$, $-21.31$ MeSi(O)CH$_2$CH$_2$-cyclic-D$_4$, $-18.93$.

Characteristic $^{13}$C NMR assignments (ppm, benzene-D$_6$ =Cr(acac)$_3$): (CH$_3$)$_3$SiO$_{0.5}$-, 2.0; CH$_3$SiO$_{1.5}$-, 2.0; CH$_3$SiOCH$_2$-, $-1.3$; CH$_3$Si(O)CH$_2$CH$_2$CH$_2$O-, 12; CH$_3$Si(O)CH$_2$CH$_2$CH$_2$O-, 24; CH$_3$Si(O)CH$_2$CH$_2$CH$_2$O-, 73; CH$_3$Si(O)CH$_2$CH$_2$-cyclic D$_4$, 8.6; CH$_3$Si(O)CH$_2$CH$_2$-cyclic D$_4$, 8.6; CH$_3$Si(O)CH$_2$CH$_2$-cyclic-Si(CH$_3$)D$_2$ or 3, $-1.3$; cyclic (CH$_3$)SiO), 0.9; CH$_3$C(O)O-, 21.1; CH$_3$C(O)O-, 169.4; CH$_3$CH=CHO-, 97.99; CH$_3$CH=CHO-, 146.47; CH$_2$=CHSi(CH$_3$)O$_{0.5}$D$_{2.3}$, 132.7; CH$_2$=CHSi(CH$_3$)O$_{0.5}$D$_{2-3}$, 136.4; CH$_2$=CHSi(CH$_3$)O$_{0.5}$D$_{2.3}$, $-1.05$; toluene, 137.6 and 21.4.

Evaluation of Surfactants in Polyurethane Flexible Foam

The siloxane-polyether polymer mixtures disclosed were evaluated in the polyurethane formulation shown below:

TABLE II

| Formulation | |
|---|---|
| Material | pphp (wt.) |
| NIAX Polyol 16-56 | 100.0 |
| Distilled Water | 5.5 |
| NIAX Catalyst A-20 | 0.2 |
| Methylene Chloride | 10.0 |
| Stannous Octoate | 0.23 |
| TDI 80/20 (112 index) | 69.44 |
| Surfactant | Varied |

Test Procedure

The temperature of the laboratory, the polyol and the TDI were noted. A 32 oz paper cup was charged with NIAX Polyol 16-56, 250 g; the surfactant to be evaluated; the amine water premix, 14.25 g, (containing water, 13.75 g, and NIAX Catalyst A-200, 0.5 g) and methylene chloride, 25 g. A brass mixing baffle with four equally spaced 0.5 inch wide vertical baffles was inserted into the cup. The mixture was stirred for 15 seconds at 2150 rpm using a drill press with a marine blade. After 20 seconds stannous octoate, 0.575 g (0.46 ml), was added to the reaction mixture. A timer was started and the mixture was stirred for 8 seconds before adding 80/20 toluene diisocyanate, 173.6 g (112 index) with continuous stirring for an additional seven seconds. The stirrer was stopped and the reaction mixture was dumped into a preweighed five gallon plastic bucket. The cup was kept inverted over the bucket for a total of ten seconds. As the foam began to rise a small 1"×1" square of aluminum foil was placed on the top of the foam to support a fixed length wire which floats in a tube calibrated for recording foam heights in inches. The maximum height of the foam at blowoff, the amount of top collapse and the rise time were recorded. The foam was placed in an oven at 120° C. for about ten minutes. The foam was allowed to cool to room temperature overnight. The height of the foam was measured in cm and then the foam was cut open using a band saw. 2"×2"×1" cubes were cut from the center, 1.5 inches below the top and 1.5 inches above the bottom of the foam. For each cube the density was measured and the breathability through the foam was determined using a Nopco breathability apparatus (adjusted back pressure to 0.5 inches of water and read air flow in standard cubic feet per minute). Each cube was lightly inked using an ink pad and pressed onto a sheet of white paper. The cell structure was determined visually by comparison to a set of standard foams and rated as fine, medium or coarse.

Profiles of final foam height, foam breathability, foam top collapse and foam density versus surfactant concentration (in pphp) were plotted for each surfactant. Two measures of surfactant potency were defined. Surfactant potency (35cm) was defined as the surfactant concentration in pphp required to give 35 cm of final foam height. Surfactant potency (1.5 pphp) was defined as the foam height (normalized to a constant temperature) obtained using the surfactant mother liquid at a concentration of 1.5 pphp. Both of these potencies were determined from the foam height profile.

The slope of a portion of the breathability profile was determined. In general, as the surfactant concentration was increased the breathability initially increased to a maximum value. This maximum corresponded to the point at which the foam height profile had just reached its plateau. As the surfactant concentration was increased continually the breathability generally dropped linearly to a minimum value and then remained constant. For Control A the minimum was reached at 1.25 pphp. For the "Silicone Enriched" surfactants the minimum was reached at 2.85 pphp. The slope of the linear drop of the breathability profile was determined and called the "bslope". This bslope was found to be correlated with the mole percent of Do in the surfactants. The bslope was also found to be independent of the surfactant potency.

The results of the foam evaluations of the surfactants are set forth below. These results demonstrate the superiority of the siloxane-polyether polymers of this invention as compared to siloxanepolyether polymers which are prepared without employing the particular components and sequence of addition set forth herein.

EXAMPLE 9

Effects of Changing the Orders of Addition for the Hydrosilylation Sequence in the Synthesis of MD$^o$$_{14.4}$D"$_{5.5}$M Surfactants Eight different orders of addition were examined for the hydrosilylation sequence involving the silane fluid, the vinyl cyclic polysiloxane, the allyl polyether and the excess of allyl polyether. In all cases a mixture of the polyhydridosiloxane polymer and toluene was initially charged in the reaction pot.

Orders of Addition

1) The allyl polyether was added; the mixture was heated to reaction temperature and then the CPA catalyst was added. After an initial exotherm the D$_3$D* was added. After a second exotherm the excess allyl polyether was added.

2) The allyl polyether and the D$_3$D* were added; the mixture was heated to reaction temperature and then the CPA was added. After an exotherm the excess allyl polyether was added.

3) The D$_3$D*, allyl polyether and excess allyl polyether were all added to the reaction mixture; the reaction mixture was heated to the reaction temperature and then the CPA catalyst was added.

4) The D$_3$D* was added; the mixture was heated to the reaction temperature and then the CPA catalyst was added. After the exotherm, the allyl polyether was added. After a second exotherm the excess allyl polyether was added.

5) The $D_3D^*$ was added; the reaction mixture was heated to the reaction temperature and then the CPA catalyst was added. After the exotherm both the allyl polyether and the excess allyl polyether were added to the reaction mixture.

6) The $D_3D^*$ was added; the mixture was heated to the reaction temperature and then the CPA catalyst was added. After the exotherm the allyl polyether was added to the reaction mixture. No excess allyl polyether was added.

As indicated below, the seventh and eighth orders of addition involved dropwise addition of the $D_3D^*$, and produced weak surfactants.

The surfactants were synthesized following the general procedure described in Example 8 except for the above variations in the order of addition of the reactants and the changes indicated in the following table.

TABLE III

| Surfactant # | PHSP # | PHSP g | Polyether BAMW | Polyether g | Polyether xs g | Pendant Si Group type | Pendant Si Group g | CPA ppm | Rxn. Temp °C. | Addition Order |
|---|---|---|---|---|---|---|---|---|---|---|
| 23 | 1 | 5.46 | 2342 | 51.7 | 15.5 | 1 | 17.8 | 120 | 90 | 1 |
| 31 | 1 | 5.46 | 2342 | 51.7 | 15.5 | 1 | 17.8 | 100 | 90 | 1 |
| 41 | 1 | 5.46 | 2342 | 51.7 | 15.5 | 1 | 17.8 | 100 | 75 | 1 |
| 32 | 1 | 5.46 | 2342 | 51.7 | 15.5 | 1 | 17.8 | 100 | 90 | 2 |
| 33 | 1 | 5.46 | 2342 | 51.7 | 15.5 | 1 | 17.8 | 100 | 90 | 3 |
| 49 | 1 | 5.46 | 2342 | 51.7 | 15.5 | 1 | 17.8 | 100 | 90 | 4 |
| 40 | 1 | 5.46 | 2342 | 51.7 | 15.5 | 1 | 17.8 | 100 | 90 | 5 |
| 72 | 1 | 5.46 | 2342 | 51.7 | 0.0 | 1 | 17.8 | 50 | 90 | 6 |
| 82 | 1 | 5.46 | 2342 | 51.7 | 15.5 | 1 | 17.8 | 100 | 90 | 7 |
| 85 | 1 | 5.46 | 2342 | 51.8 | 15.5 | 1 | 17.8 | 100 | 90 | 8 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table.

TABLE IV

| Surfactant # | Surfactant Concentration (pphp) | Height of Foam Rise (cm) at 25° C. | Airflow (scfm) | Top Collapse (cm) |
|---|---|---|---|---|
| 23 | 1.25 | C | — | — |
| 31 | 1.25 | C | — | — |
| 41 | 2.85 | C | — | — |
| 41 | 5.00 | C | — | — |
| 32 | 0.85 | 31.00 | 5.50 | −5.60 |
| 32 | 1.25 | 31.20 | 6.00 | −5.10 |
| 32 | 2.85 | 31.70 | 6.25 | −4.60 |
| 32 | 5.00 | 30.20 | 6.25 | −6.40 |
| 33 | 1.25 | C | — | — |
| 33 | 5.00 | C | — | — |
| 49 | 0.45 | 32.50 | — | — |
| 49 | 0.50 | 36.91 | 3.50 | −1.02 |
| 49 | 0.55 | 37.10 | 4.50 | −1.27 |
| 49 | 0.65 | 38.10 | 5.00 | −1.02 |
| 49 | 0.75 | 38.70 | 6.00 | −0.76 |
| 49 | 1.50 | 38.71 | 4.75 | −0.51 |
| 49 | 2.85 | 39.21 | 3.25 | −0.25 |
| 49 | 5.00 | 39.51 | 3.35 | 0.00 |
| 40 | 0.45 | C | — | — |
| 40 | 0.55 | 35.30 | — | −2.54 |
| 40 | 0.65 | 37.80 | 4.00 | −1.27 |
| 40 | 0.75 | 38.80 | 5.25 | −0.76 |
| 40 | 0.85 | 38.90 | 5.00 | −1.00 |
| 40 | 1.50 | 39.40 | 4.00 | −0.50 |
| 40 | 2.85 | 39.60 | 3.00 | 0.00 |
| 40 | 5.00 | 39.90 | 2.80 | 0.00 |
| 72 | 0.20 | 25.95 | 1.60 | −9.65 |
| 72 | 0.25 | 28.40 | 2.15 | −7.87 |
| 72 | 0.30 | 31.80 | 2.05 | −4.83 |
| 72 | 0.45 | 35.35 | 5.00 | −2.29 |
| 72 | 0.85 | 37.85 | 6.00 | −0.51 |
| 72 | 1.25 | 38.05 | 5.25 | −0.50 |
| 72 | 2.85 | 38.55 | 2.80 | 0.00 |
| 72 | 5.00 | 38.35 | 3.00 | 0.00 |
| 82 | 5.00 | C | — | — |
| 85 | 0.45 | C | — | — |
| 85 | 0.55 | 24.40 | — | −13.72 |
| 85 | 0.65 | 30.50 | — | −7.62 |
| 85 | 0.85 | 33.00 | 7.00 | −5.08 |
| 85 | 0.95 | 35.00 | 7.50 | −3.05 |
| 85 | 1.05 | 36.00 | 7.50 | −1.78 |
| 85 | 1.15 | 36.30 | 7.50 | −1.78 |
| 85 | 1.25 | 36.55 | 7.75 | −1.78 |
| 85 | 2.85 | 37.55 | 6.00 | −1.52 |
| 85 | 5.00 | 36.60 | 3.50 | −2.29 | where C indicates that the foam collapsed.

The first, third and seventh addition order gave hazy surfactants that over a wide range of structures and use levels gave total foam collapse in the flexible polyurethane foam test. The second addition order resulted in hazy surfactants with low potency in the 0.8–2.0 pphp range. Surfactants prepared using the fourth, fifth, and sixth addition orders were hot hazy and provided high potency in the 0.35–0.8 pphp range. The seventh and eight orders of addition representing dropwise addition of the $D_3D^*$ gave weak surfactants. It was determined that the important factors in making these surfactants were, in part, reacting the $D_3D^*$ completely before adding the allyl polyether; keeping the catalyst "active" until the allyl polyether has been added by using higher catalyst levels and/or lower reaction temperatures.

EXAMPLE 10

Effect of Changing the Orders of Addition for the Hydrosilylation Sequence In The Synthesis of $MD^o{}_{14.4}D''{}_{7.5}M$ Surfactants Three different orders of addition were examined for the hydrosilylation sequence for the surfactant structure $MD^o{}_{14.4}D''{}_{7.5}M$. These orders of addition correspond to the 1st, 2nd, and 4th orders of addition described in Example 9. The surfactants were synthesized following the general procedure described in Example 8 except for the above variations in the order of addition of the reactants and the changes indicated in the following table.

TABLE V

| Surfactant # | PHSP # | g | Polyether BAMW | g | xs g | Pendant Si Group type | g | CPA ppm | Rxn. Temp °C. | Addition Order |
|---|---|---|---|---|---|---|---|---|---|---|
| 2 | 7 | 4.73 | 2342 | 56.1 | 16.8 | 1 | 14.2 | 90 | 90 | 1 |
| 37 | 7 | 4.72 | 2342 | 56.1 | 16.8 | 1 | 14.2 | 100 | 90 | 2 |
| 52 | 7 | 4.72 | 2342 | 56.1 | 16.8 | 1 | 14.2 | 100 | 90 | 4 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE VI

| Surfactant # | Surfactant Concentration (pphp) | Height of Foam Rise (cm) at 25° C. | Airflow (scfm) | Top Collapse (cm) |
|---|---|---|---|---|
| 2 | 0.85 | C | — | — |
| 2 | 1.25 | 33.45 | 4.50 | −3.60 |
| 2 | 2.85 | 36.60 | 5.20 | −2.30 |
| 2 | 3.25 | 36.85 | 5.00 | −1.60 |
| 2 | 3.65 | 37.10 | 5.00 | −0.90 |
| 37 | 0.45 | 30.40 | 3.25 | −5.84 |
| 37 | 1.50 | 35.30 | 4.50 | −3.05 |
| 37 | 2.85 | 36.50 | 6.50 | −1.80 |
| 52 | 0.45 | C | — | — |
| 52 | 0.50 | 29.05 | — | −8.38 |
| 52 | 0.55 | 32.80 | — | −5.08 |
| 52 | 0.65 | 37.60 | 3.50 | −1.02 |
| 52 | 0.75 | 38.10 | 3.50 | −1.02 |
| 52 | 0.85 | 38.80 | 3.25 | −0.76 |
| 52 | 1.25 | 40.10 | 3.50 | −0.51 |
| 52 | 1.50 | 39.60 | 3.00 | −0.51 |
| 52 | 2.85 | 40.10 | 3.00 | 0.00 | where C indicates that the foam collapsed.

The first and second addition orders gave surfactants with low potency in the flexible polyurethane foam test. In contrast the fourth order of addition sequence gave a much more potent surfactant.

EXAMPLE 11

The effect of changing the Orders of Addition for the Hydrosilylation Sequence in the Synthesis of $MD^o{}_{14.4}D''{}_{5.5}M$ Surfactants at 60° C.

Three different orders of addition were examined for the hydrosilylation sequence for the surfactant structure $MD^o{}_{14.4}D''{}_{5.5}M$ at an initial temperature of 60° C. These orders of addition correspond to the fourth, fifth and sixth orders of addition described in Example 10 above.

The surfactants were synthesized following the general procedure described in Example 8 except for the above variations in the order of addition of the reactants and the changes indicated in the following table.

TABLE VII

| Surfactant # | PHSP # | g | Polyether BAMW | g | xs g | Pendant Si Group type | g | CPA ppm | Rxn. Temp °C. | Addition Order |
|---|---|---|---|---|---|---|---|---|---|---|
| 74 | 1 | 5.46 | 2342 | 51.7 | 15.5 | 1 | 17.8 | 100 | 60 | 4 |
| 75 | 1 | 5.46 | 2342 | 51.7 | 15.5 | 1 | 17.8 | 100 | 60 | 5 |
| 73 | 1 | 5.46 | 2342 | 51.7 | 0.0 | 1 | 17.8 | 100 | 60 | 6 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth below in Table VIII:

TABLE VIII

| Surfactant # | Surfactant Concentration (pphp) | Height of Foam Rise (cm) at 25° C. | Airflow (scfm) | Top Collapse (cm) |
|---|---|---|---|---|
| 74 | 0.35 | 30.75 | — | −6.60 |
| 74 | 0.45 | 34.75 | 3.25 | −3.05 |
| 74 | 1.25 | 38.35 | 5.00 | −0.51 |
| 74 | 2.85 | 38.35 | 3.50 | −0.51 |
| 74 | 5.00 | 37.85 | 3.25 | 0.00 |
| 75 | 0.35 | 29.05 | — | −8.38 |
| 75 | 0.45 | 34.55 | 2.55 | −2.54 |
| 75 | 0.55 | 37.30 | 4.00 | −1.02 |
| 75 | 0.85 | 38.60 | 5.00 | −0.51 |
| 75 | 1.25 | 38.90 | 5.50 | −0.51 |
| 75 | 2.85 | 38.60 | 3.00 | −0.25 |
| 75 | 5.00 | 38.60 | 3.00 | 0.00 |
| 73 | 1.25 | C | — | — |
| 73 | 2.85 | 34.80 | 5.50 | −3.30 |
| 73 | 3.25 | C | — | — | where C indicates that the foam collapsed.

The fourth and fifth orders or addition gave high potency surfactants at 60° C. The surfactant from the sixth order of addition was hazy and very weak.

EXAMPLE 12

The effect of Changing the Orders of Addition for the Hyrdosilylation Sequence in the Synthesis of $MD^o{}_{11.0}D''{}_{6.5}M$ and $MD^o{}_{8.8}D''{}_{5.5}M$ Surfactants Where $D^o=MeSi(O)CH_2CH_2$-cyclic $D_5$ Two orders of addition, the first and fourth were examined for the hydrosilation sequence for surfactant structures $MD^o{}_{11.0}D''{}_{6.5}M$ and $MD^o{}_{8.8}D''{}_{5.5}D$, incorporating cyclic $D_5$ rings.

The surfactants were synthesized following the general procedure described in Example 8 except for the above variations in the order of addition of the reactants and the changes indicated in the following table:

TABLE IX

| Surfactant # | PHSP # | g | Polyether BAMW | g | xs g | Pendant Si Group type | g | CPA ppm | Rxn. Temp °C. | Addition Order | $MD^\circ{}_xD''{}_yM$ x | y |
|---|---|---|---|---|---|---|---|---|---|---|---|---|
| 103 | 12 | 4.41 | 2342 | 55.3 | 16.6 | 4 | 15.3 | 100 | 90 | 1 | 11.0 | 6.5 |
| 106 | 15 | 4.44 | 2342 | 55.9 | 16.8 | 4 | 14.6 | 100 | 90 | 1 | 8.8 | 5.5 |
| 203 | 12 | 4.41 | 2342 | 55.3 | 16.6 | 4 | 15.3 | 100 | 90 | 4 | 11.0 | 6.5 |
| 206 | 15 | 4.44 | 2342 | 55.9 | 16.8 | 4 | 14.6 | 100 | 90 | 4 | 8.8 | 5.5 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE X

| Surfactant # | Surfactant Concentration (pphp) | Height of Foam Rise (cm) at 25° C. | Airflow (scfm) | Top Collapse (cm) |
|---|---|---|---|---|
| 103 | 1.25 | C | — | — |
| 106 | 1.25 | C | — | — |
| 203 | 0.45 | C | — | — |
| 203 | 0.50 | C | — | — |
| 203 | 0.65 | 34.30 | 2.60 | −1.50 |
| 203 | 0.75 | 36.60 | 3.50 | −1.30 |
| 203 | 0.85 | 38.05 | 4.50 | −1.30 |
| 203 | 1.50 | 39.10 | 4.00 | −0.76 |
| 203 | 2.85 | 39.65 | 2.30 | −0.25 |
| 206 | 0.45 | 27.90 | — | −10.70 |
| 206 | 0.50 | 31.05 | — | −7.11 |
| 206 | 0.65 | 36.60 | 4.00 | −1.00 |
| 206 | 0.75 | 37.10 | 4.00 | −0.80 |
| 206 | 0.85 | 39.05 | 4.25 | −1.00 |
| 206 | 1.50 | 39.60 | 3.50 | −0.76 |

Where C indicates that the foam collapsed.

Surfactants prepared using the first order of addition failed to stabilize foam. Surfactants prepared using the fourth order of addition were moderately potent at stabilizing foam.

EXAMPLE 13

Superior Performance of "Silicone Enriched" Surfactants over Controls A and B The advantages of the surfactants of this invention over comparable flexible foam surfactants are demonstrated in this example. The surfactants were synthesized according to the procedure followed in Example 8 except for the variations indicated in the following table:

TABLE XI

| Surfactant # | PHSP # | g | Polyether BAMW | g | xs g | Pendant Si Group type | g | CPA ppm | Rxn. Temp °C. | Addition Order | $MD^\circ{}_xD''{}_yM$ x | y |
|---|---|---|---|---|---|---|---|---|---|---|---|---|
| 54 | 13 | 5.60 | 2342 | 51.6 | 15.5 | 1 | 17.8 | 100 | 90 | 4 | 11.5 | 4.4 |
| 55 | 10 | 5.98 | 2342 | 48.5 | 14.6 | 1 | 20.5 | 100 | 90 | 4 | 14.4 | 4.5 |
| 56 | 10 | 4.99 | 2342 | 54.8 | 16.5 | 1 | 15.2 | 100 | 90 | 4 | 12.8 | 6.1 |
| 78 | 1 | 5.46 | 2342 | 51.7 | 0.0 | 1 | 17.8 | 100 | 60 | 6 | 14.4 | 5.5 |
| 202 | 12 | 4.63 | 2342 | 53.6 | 16.1 | 4 | 16.8 | 100 | 90 | 4 | 11.5 | 6.0 |
| 203 | 12 | 4.41 | 2342 | 55.3 | 16.6 | 4 | 15.3 | 100 | 90 | 4 | 11.0 | 6.5 |
| 204 | 15 | 5.01 | 2342 | 51.6 | 15.5 | 4 | 18.4 | 100 | 90 | 4 | 9.8 | 4.5 |
| 205 | 15 | 4.71 | 2342 | 53.9 | 16.2 | 4 | 16.4 | 100 | 90 | 4 | 9.3 | 5.0 |
| 206 | 15 | 4.44 | 2342 | 55.9 | 16.8 | 4 | 14.6 | 100 | 90 | 4 | 8.8 | 5.5 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE XII

| Surfactant # | Surfactant Concentration (pphp) | Height of Foam Rise (cm) at 25° C. | Airflow (scfm) | Top Collapse (cm) |
|---|---|---|---|---|
| Control A | 0.40 | 34.85 | 5.50 | −4.06 |
| Control A | 0.45 | 35.75 | 6.50 | −2.08 |
| Control A | 0.85 | 39.15 | 4.40 | −0.80 |
| Control A | 1.25 | 39.15 | 2.05 | −0.40 |
| Control A | 1.50 | 39.15 | 2.00 | 0.00 |
| Control B | 0.45 | 30.20 | — | −6.60 |
| Control B | 0.85 | 33.80 | — | −2.79 |
| Control B | 1.25 | 36.80 | 4.50 | −0.76 |
| Control B | 2.85 | 38.10 | 2.00 | −0.51 |
| 54 | 0.45 | 33.80 | 1.95 | −4.60 |
| 54 | 0.50 | 35.65 | — | −1.52 |
| 54 | 0.55 | 37.10 | 5.00 | −1.27 |
| 54 | 0.65 | 37.80 | 4.50 | −1.27 |
| 54 | 0.75 | 38.40 | 4.50 | −1.02 |
| 54 | 0.85 | 38.30 | 4.50 | −1.27 |
| 54 | 1.25 | 39.60 | 3.75 | −1.02 |
| 54 | 1.50 | 39.10 | 3.00 | −0.76 |
| 54 | 2.85 | 39.90 | 2.45 | −0.25 |
| 55 | 0.45 | 33.80 | — | −4.30 |
| 55 | 0.50 | 34.15 | — | −3.56 |
| 55 | 0.55 | 36.10 | 6.00 | −2.03 |
| 55 | 0.65 | 36.80 | 6.50 | −1.52 |
| 55 | 0.75 | 38.10 | 6.60 | −0.51 |
| 55 | 0.85 | 38.60 | 7.25 | −1.02 |
| 55 | 1.25 | 39.40 | 5.25 | −0.76 |
| 55 | 1.50 | 38.60 | 4.00 | −0.76 |
| 55 | 2.85 | 39.40 | 1.85 | −0.51 |
| 56 | 0.45 | 26.40 | — | −11.90 |
| 56 | 0.50 | 32.05 | — | −5.84 |
| 56 | 0.55 | 36.10 | 2.30 | −1.27 |
| 56 | 0.65 | 37.60 | 2.80 | −1.02 |
| 56 | 0.75 | 38.40 | 2.70 | −1.02 |
| 56 | 0.85 | 39.90 | 2.50 | −0.51 |
| 56 | 1.25 | 40.60 | 3.25 | −0.51 |
| 56 | 1.50 | 40.10 | 3.25 | −0.51 |
| 56 | 2.85 | 40.40 | 2.70 | −0.25 |

TABLE XII-continued

| Surfactant # | Surfactant Concentration (pphp) | Height of Foam Rise (cm) at 25° C. | Airflow (scfm) | Top Collapse (cm) |
|---|---|---|---|---|
| 78 | 0.10 | 19.25 | — | −14.00 |
| 78 | 0.20 | 32.75 | 3.50 | −4.83 |
| 78 | 0.30 | 33.05 | 4.00 | −4.06 |
| 78 | 0.35 | 35.30 | 3.75 | −2.54 |
| 78 | 0.45 | 36.30 | 4.00 | −2.03 |
| 78 | 0.85 | 37.60 | 5.50 | −1.27 |
| 78 | 1.25 | 37.80 | 6.00 | −1.02 |
| 78 | 2.85 | 37.80 | 5.25 | −1.02 |
| 78 | 5.00 | 36.70 | 3.50 | −1.27 |
| 202 | 0.45 | C | — | — |
| 202 | 0.50 | C | — | — |
| 202 | 0.65 | 33.80 | 3.50 | −2.00 |
| 202 | 0.75 | 35.80 | 4.00 | −0.80 |
| 202 | 0.85 | 37.85 | 5.75 | −1.30 |
| 202 | 1.50 | 39.10 | 4.00 | −0.51 |
| 202 | 2.85 | 39.35 | 1.85 | −0.25 |
| 203 | 0.45 | C | — | — |
| 203 | 0.50 | C | — | — |
| 203 | 0.65 | 34.30 | 2.60 | −1.50 |
| 203 | 0.75 | 36.60 | 3.50 | −1.30 |
| 203 | 0.85 | 38.05 | 4.50 | −1.30 |
| 203 | 1.50 | 39.10 | 4.00 | −0.76 |
| 203 | 2.85 | 39.65 | 2.30 | −0.25 |
| 204 | 0.45 | C | — | — |
| 204 | 0.50 | 30.05 | — | −7.37 |
| 204 | 0.65 | 36.80 | 5.00 | −0.80 |
| 204 | 0.75 | 37.30 | 5.00 | −0.80 |
| 204 | 0.85 | 38.55 | 6.00 | −1.30 |
| 204 | 1.50 | 39.40 | 4.75 | −0.51 |
| 204 | 2.85 | 39.65 | 2.10 | −0.25 |
| 205 | 0.45 | 32.20 | — | −6.40 |
| 205 | 0.50 | 35.65 | — | −2.29 |
| 205 | 0.55 | 35.50 | 5.00 | −1.50 |
| 205 | 0.60 | 36.30 | 5.00 | −1.30 |
| 205 | 0.85 | 39.05 | 6.00 | −1.00 |
| 205 | 1.50 | 39.10 | 5.00 | −0.76 |
| 205 | 2.85 | 39.65 | 3.00 | −0.25 |
| 206 | 0.45 | 27.90 | — | −10.70 |
| 206 | 0.50 | 31.05 | — | −7.11 |
| 206 | 0.65 | 36.60 | 4.00 | −1.00 |
| 206 | 0.75 | 37.10 | 4.00 | −0.80 |
| 206 | 0.85 | 39.05 | 4.25 | −1.00 |
| 206 | 1.50 | 39.60 | 3.50 | −0.76 |
| 206 | 2.85 | 39.85 | 2.65 | −0.51 |

Where C indicates that the foam collapsed.

Surfactants 54–56, 78 and 202–204 show greater potency than Controls A and B and as well as flatter breathability profiles.

EXAMPLE 14

Effect of Changing the Number of $D^0$ and $D''$ Units in Surfactants Synthesized Using the 4Th Order of Addition and Cyclic $D_4$ Pendant Groups The surfactants described in this example all contain cyclic $D_4$ pendant groups and were all synthesized in the manner described in Example 8 except for using the 4th order of addition described in Example 9 and the variations indicated in the following table:

TABLE XIII

| Surfactant # | PHSP # | PHSP g | Polyether BAMW | Polyether g | xs g | Pendant Si Group type | Pendant Si Group g | CPA ppm | Rxn. Temp °C. | Addition Order | $MD^0{}_xD''{}_yM$ x | $MD^0{}_xD''{}_yM$ y |
|---|---|---|---|---|---|---|---|---|---|---|---|---|
| 49 | 1 | 5.46 | 2342 | 51.7 | 15.5 | 1 | 17.8 | 100 | 90 | 4 | 14.4 | 5.5 |
| 52 | 7 | 4.72 | 2342 | 56.1 | 16.8 | 1 | 14.2 | 100 | 90 | 4 | 14.4 | 7.5 |
| 53 | 12 | 4.84 | 2342 | 56.0 | 16.8 | 1 | 14.1 | 100 | 90 | 4 | 11.5 | 4.4 |
| 54 | 13 | 5.60 | 2342 | 51.6 | 15.5 | 1 | 17.8 | 100 | 90 | 4 | 11.5 | 4.4 |
| 55 | 10 | 5.98 | 2342 | 48.5 | 14.6 | 1 | 20.5 | 100 | 90 | 4 | 14.4 | 4.5 |
| 56 | 10 | 4.99 | 2342 | 54.8 | 16.5 | 1 | 15.2 | 100 | 90 | 4 | 12.8 | 6.1 |
| 57 | 10 | 5.20 | 2342 | 53.5 | 16.0 | 1 | 16.3 | 100 | 90 | 4 | 13.2 | 5.7 |
| 58 | 6 | 4.24 | 2342 | 59.0 | 17.7 | 1 | 11.8 | 100 | 90 | 4 | 14.4 | 9.5 |
| 59 | 14 | 4.13 | 2342 | 60.9 | 18.2 | 1 | 10.0 | 100 | 90 | 4 | 8.6 | 6.9 |
| 60 | 17 | 5.85 | 2342 | 51.5 | 15.4 | 1 | 17.7 | 100 | 90 | 4 | 8.6 | 3.3 |
| 61 | 18 | 7.21 | 2342 | 44.0 | 13.2 | 1 | 23.8 | 100 | 90 | 4 | 8.6 | 2.1 |
| 62 | 13 | 9.24 | 2342 | 29.0 | 8.7 | 1 | 36.7 | 100 | 90 | 4 | 14.4 | 1.5 |
| 63 | 10 | 5.70 | 2342 | 50.3 | 15.1 | 1 | 19.0 | 100 | 90 | 4 | 14.0 | 4.9 |
| 65 | 6 | 5.36 | 2342 | 51.8 | 15.5 | 1 | 17.9 | 25 | 90 | 4 | 17.3 | 6.6 |
| 67 | 18 | 5.59 | 2342 | 53.6 | 16.1 | 1 | 15.8 | 50 | 90 | 4 | 7.4 | 3.3 |
| 68 | 18 | 4.42 | 2342 | 60.4 | 18.1 | 1 | 10.2 | 25 | 90 | 4 | 6.0 | 4.7 |
| 71 | 3 | 5.23 | 2342 | 51.8 | 15.5 | 1 | 17.9 | 75 | 90 | 4 | 19.9 | 7.6 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the table below:

TABLE XIV

| Surfactant # | Surfactant Concentration (pphp) | Height of Foam Rise (cm) at 25° C. | Airflow (scfm) | Top Collapse (cm) |
|---|---|---|---|---|
| 49 | 0.45 | 32.50 | — | — |
| 49 | 0.50 | 36.91 | 3.50 | −1.02 |
| 49 | 0.55 | 37.10 | 4.50 | −1.27 |
| 49 | 0.65 | 38.10 | 5.00 | −1.02 |
| 49 | 0.75 | 38.70 | 6.00 | −0.76 |
| 49 | 1.50 | 38.71 | 4.75 | −0.51 |
| 49 | 2.85 | 39.21 | 3.25 | −0.25 |
| 49 | 5.00 | 39.51 | 3.35 | 0.00 |
| 52 | 0.45 | C | — | — |
| 52 | 0.50 | 29.05 | — | −8.38 |
| 52 | 0.55 | 32.80 | — | −5.08 |
| 52 | 0.65 | 37.60 | 3.50 | −1.02 |
| 52 | 0.75 | 38.10 | 3.50 | −1.02 |
| 52 | 0.85 | 38.80 | 3.25 | −0.76 |
| 52 | 1.25 | 40.10 | 3.50 | −0.51 |
| 52 | 1.50 | 39.60 | 3.00 | −0.51 |
| 52 | 2.85 | 40.10 | 3.00 | 0.00 |
| 53 | 0.45 | C | — | — |
| 53 | 0.50 | 29.55 | — | −8.13 |
| 53 | 0.55 | 35.60 | 1.60 | −1.78 |
| 53 | 0.65 | 36.60 | 1.90 | −0.76 |
| 53 | 0.75 | 37.80 | 2.40 | −0.76 |
| 53 | 0.85 | 39.40 | 3.25 | −0.51 |
| 53 | 1.25 | 40.40 | 2.75 | −0.51 |
| 53 | 1.50 | 40.40 | 2.35 | −0.51 |
| 53 | 2.85 | 40.40 | 3.25 | −0.25 |
| 54 | 0.45 | 33.80 | 1.95 | −4.60 |
| 54 | 0.50 | 35.65 | — | −1.52 |

TABLE XIV-continued

| Surfactant # | Surfactant Concentration (pphp) | Height of Foam Rise (cm) at 25° C. | Airflow (scfm) | Top Collapse (cm) |
|---|---|---|---|---|
| 54 | 0.55 | 37.10 | 5.00 | −1.27 |
| 54 | 0.65 | 37.80 | 4.50 | −1.27 |
| 54 | 0.75 | 38.40 | 4.50 | −1.02 |
| 54 | 0.85 | 38.30 | 4.50 | −1.27 |
| 54 | 1.25 | 39.60 | 3.75 | −1.02 |
| 54 | 1.50 | 39.10 | 3.00 | −0.76 |
| 54 | 2.85 | 39.90 | 2.45 | −0.25 |
| 55 | 0.45 | 33.80 | — | −4.30 |
| 55 | 0.50 | 34.15 | — | −3.56 |
| 55 | 0.55 | 36.10 | 6.00 | −2.03 |
| 55 | 0.65 | 36.80 | 6.50 | −1.52 |
| 55 | 0.75 | 38.10 | 6.60 | −0.51 |
| 55 | 0.85 | 38.60 | 7.25 | −1.02 |
| 55 | 1.25 | 39.40 | 5.25 | −0.76 |
| 55 | 1.50 | 38.60 | 4.00 | −0.76 |
| 55 | 2.85 | 39.40 | 1.85 | −0.51 |
| 56 | 0.45 | 26.40 | — | −11.90 |
| 56 | 0.50 | 32.05 | — | −5.84 |
| 56 | 0.55 | 36.10 | 2.30 | −1.27 |
| 56 | 0.65 | 37.60 | 2.80 | −1.02 |
| 56 | 0.75 | 38.40 | 2.70 | −1.02 |
| 56 | 0.85 | 39.90 | 2.50 | −0.51 |
| 56 | 1.25 | 40.60 | 3.25 | −0.51 |
| 56 | 1.50 | 40.10 | 3.25 | −0.51 |
| 56 | 2.85 | 40.40 | 2.70 | −0.25 |
| 57 | 0.45 | C | — | — |
| 57 | 0.50 | 34.80 | — | −4.10 |
| 57 | 0.60 | 36.10 | 4.00 | −1.00 |
| 57 | 0.65 | 36.80 | 4.00 | −1.30 |
| 57 | 0.85 | 39.10 | 4.00 | −1.02 |
| 57 | 1.25 | 39.60 | 3.75 | −0.76 |
| 57 | 1.50 | 39.10 | 3.50 | −0.51 |
| 57 | 2.85 | 40.10 | 1.95 | −0.25 |
| 58 | 0.45 | C | — | — |
| 58 | 0.65 | 35.30 | 2.40 | −2.00 |
| 58 | 0.75 | 36.30 | 2.70 | −1.00 |
| 58 | 0.85 | 36.60 | 3.50 | −1.02 |
| 58 | 1.25 | 38.10 | 3.50 | −0.76 |
| 58 | 2.85 | 38.40 | 4.00 | −0.76 |
| 59 | 0.45 | C | — | — |
| 59 | 0.85 | 31.00 | — | −5.84 |
| 59 | 0.90 | 35.80 | 2.50 | −1.30 |
| 59 | 1.00 | 36.10 | 2.90 | −1.30 |
| 59 | 1.25 | 35.80 | 3.50 | −1.52 |
| 59 | 2.85 | 37.60 | 4.00 | −0.76 |
| 60 | 0.45 | C | — | — |
| 60 | 0.85 | 34.10 | 4.00 | 2.79 |
| 60 | 0.90 | 33.80 | 3.50 | −2.30 |
| 60 | 1.00 | 34.80 | 3.50 | −2.00 |
| 60 | 1.25 | 36.10 | 4.50 | −1.27 |
| 60 | 2.85 | 37.90 | 2.60 | −0.25 |
| 61 | 0.45 | 30.30 | — | −5.08 |
| 61 | 0.50 | 33.50 | — | −2.30 |
| 61 | 0.85 | 36.40 | 6.00 | −1.52 |
| 61 | 1.25 | 37.10 | 5.00 | −0.76 |
| 61 | 2.85 | 37.10 | 1.70 | −0.51 |
| 62 | 0.45 | C | — | — |
| 62 | 0.85 | C | — | — |
| 62 | 1.25 | C | — | — |
| 63 | 0.45 | C | — | — |
| 63 | 0.65 | 33.80 | — | −2.30 |
| 63 | 0.75 | 35.10 | 4.00 | −1.30 |
| 63 | 0.85 | 36.30 | 5.00 | −1.27 |
| 63 | 1.25 | 37.10 | 6.00 | −0.76 |
| 63 | 2.85 | 37.60 | 3.30 | −0.25 |
| 65 | 0.35 | C | — | — |
| 65 | 0.40 | 30.75 | — | −5.84 |
| 65 | 0.45 | 35.85 | 4.00 | −2.00 |
| 65 | 0.65 | 37.35 | 4.00 | −0.51 |
| 65 | 0.85 | 37.85 | 3.75 | −0.51 |
| 65 | 1.25 | 38.30 | 3.50 | −0.25 |
| 65 | 2.85 | 38.80 | 2.80 | 0.00 |
| 65 | 5.00 | 38.60 | 3.00 | 0.00 |
| 67 | 0.85 | 24.35 | — | −11.40 |
| 67 | 1.25 | 27.70 | — | −8.40 |
| 67 | 2.85 | 32.00 | 4.00 | −4.10 |
| 67 | 5.00 | 34.30 | 2.85 | −2.50 |
| 68 | 0.85 | C | — | — |
| 68 | 1.00 | 31.70 | 4.50 | −4.06 |
| 68 | 1.25 | 33.00 | 4.00 | −3.30 |
| 68 | 2.85 | 30.20 | 5.25 | −5.60 |
| 68 | 5.00 | 26.90 | 5.75 | −8.90 |
| 71 | 0.10 | 26.15 | 1.20 | −8.89 |
| 71 | 0.15 | 22.65 | 1.65 | −11.94 |
| 71 | 0.35 | 34.10 | 3.00 | −3.05 |
| 71 | 0.45 | 35.55 | 3.50 | −2.03 |
| 71 | 0.85 | 37.55 | 4.00 | −0.51 |
| 71 | 1.25 | 37.85 | 4.50 | −0.76 |
| 71 | 2.85 | 37.85 | 3.75 | −0.25 |
| 71 | 5.00 | 37.85 | 4.00 | −0.50 | where C indicates that the foam collapsed.

These results demonstrate the effect of changes in the number of $D^o$ and $D''$ units in the surfactant on the performance of the surfactant in flexible urethane foam. These surfactants exhibit a wide range of both potencies and foam breathability profiles. In addition these results show that the flatness of the foam breathability profile is not related to surfactant potency. For example, surfactants 53 and 55 have the same potency (0.54 parts) but very different breathability profiles (bslope=0.125 and −2.5, respectively).

EXAMPLE 15

Effect of Changing the Number of $D^o$ and $D''$ Units in Surfactants Synthesized Using the 2nd Order of Addition and Cyclic D4 Pendant Groups The surfactants described in this example all contain cyclic $D_4$ pendant groups and were all synthesized in the manner described in Example 8 except for using the 2nd order of addition described in Example 9 and the variations indicated in the following table:

TABLE XV

| Surfactant # | PHSP # | PHSP g | Polyether BAMW | Polyether g | Polyether xs g | Pendant Si Group type | Pendant Si Group g | CPA ppm | Rxn. Temp °C. | Addition Order | $MD^o{}_xD''{}_yM$ x | $MD^o{}_xD''{}_yM$ y |
|---|---|---|---|---|---|---|---|---|---|---|---|---|
| 5 | 17 | 5.85 | 2342 | 51.5 | 15.4 | 1 | 17.7 | 172 | 90 | 2 | 8.6 | 3.3 |
| 7 | 12 | 4.84 | 2342 | 56.0 | 16.8 | 1 | 14.1 | 120 | 90 | 2 | 11.5 | 6.0 |
| 37 | 7 | 4.72 | 2342 | 56.1 | 16.8 | 1 | 14.2 | 100 | 90 | 2 | 14.4 | 7.5 |
| 38 | 6 | 4.24 | 2342 | 59.0 | 17.7 | 1 | 11.8 | 100 | 90 | 2 | 14.4 | 9.5 |
| 39 | 14 | 4.12 | 2342 | 60.9 | 18.3 | 1 | 10.0 | 100 | 90 | 2 | 8.6 | 6.9 |
| 42 | 1 | 5.46 | 2342 | 51.7 | 15.5 | 1 | 17.8 | 100 | 75 | 2 | 14.4 | 5.5 |
| 43 | 6 | 5.36 | 2342 | 51.8 | 15.5 | 1 | 17.9 | 100 | 90 | 2 | 17.3 | 6.6 |
| 44 | 3 | 5.29 | 2342 | 51.8 | 15.5 | 1 | 17.9 | 100 | 90 | 2 | 19.9 | 7.6 |

TABLE XV-continued

| Surfactant # | PHSP # | g | Polyether BAMW | g | xs g | Pendant Si Group type | g | CPA ppm | Rxn. Temp °C. | Addition Order | $MD^0{}_xD''{}_yM$ x | y |
|---|---|---|---|---|---|---|---|---|---|---|---|---|
| 45 | 10 | 5.98 | 2342 | 48.5 | 14.6 | 1 | 20.5 | 100 | 90 | 2 | 14.4 | 4.5 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE XVI

| Surfactant # | Surfactant Concentration (pphp) | Height of Foam Rise (cm) at 25° C. | Airflow (scfm) | Top Collapse (cm) |
|---|---|---|---|---|
| 5 | 0.85 | C | — | — |
| 5 | 1.25 | 27.30 | 7.10 | −10.30 |
| 5 | 2.85 | 27.10 | 7.30 | −8.00 |
| 5 | 3.25 | 27.30 | 7.00 | −8.00 |
| 5 | 5.00 | 27.60 | 6.80 | −8.00 |
| 7 | 0.85 | C | — | — |
| 7 | 1.25 | 32.95 | 5.50 | −3.80 |
| 7 | 2.45 | 36.40 | 5.50 | −2.00 |
| 7 | 2.85 | 37.30 | 5.50 | −1.30 |
| 7 | 3.25 | 37.30 | 5.00 | −1.30 |
| 37 | 0.45 | 30.40 | 3.25 | 5.84 |
| 37 | 1.50 | 35.30 | 4.50 | −3.05 |
| 37 | 2.85 | 36.50 | 6.50 | −1.80 |
| 38 | 2.85 | C | — | — |
| 38 | 3.25 | 35.60 | 4.25 | −3.00 |
| 38 | 3.65 | 34.80 | 6.50 | −2.80 |
| 38 | 5.00 | 35.05 | 6.75 | −2.00 |
| 39 | 0.85 | C | — | — |
| 39 | 1.25 | 33.80 | 2.15 | −3.60 |
| 39 | 1.50 | 34.80 | 2.05 | −2.80 |
| 39 | 2.85 | 35.00 | 4.75 | −3.00 |
| 42 | 0.45 | 28.90 | — | — |
| 42 | 0.85 | 34.50 | 4.25 | −3.30 |
| 42 | 1.25 | 35.30 | 4.00 | −2.30 |
| 42 | 2.85 | 34.55 | 5.50 | −2.80 |
| 43 | 0.45 | 32.00 | 4.50 | −5.08 |
| 43 | 0.85 | 32.50 | 3.50 | −2.29 |
| 43 | 1.25 | 35.80 | 5.00 | −2.29 |
| 43 | 1.50 | 36.30 | 6.00 | −1.52 |
| 44 | 0.45 | 28.40 | — | −9.14 |
| 44 | 0.85 | 36.60 | 6.50 | −1.27 |
| 44 | 1.25 | 37.80 | 5.00 | −0.76 |
| 44 | 1.50 | 38.30 | 4.50 | −0.76 |
| 45 | 0.45 | 32.70 | 5.50 | −4.32 |
| 45 | 0.85 | 35.30 | 5.25' | −2.54 |
| 45 | 1.25 | 36.30 | 5.75 | −2.03 |
| 45 | 1.50 | 36.60 | 6.50 | −2.03 | where C indicates that the foam collapsed.

These results demonstrate the effect of changes in the number of $D^0$ and $D''$ units in the surfactant on the performance of the surfactant in flexible urethane foam. These surfactants exhibit a wide range of both potencies and foam breathability profiles. In addition these results show that the flatness of the foam breathability profile is not related to surfactant potency. For example, surfactants 44 and 45 have the same potency (0.8 parts) but very different breathability profiles (bslope = −3.1 and +1.9 respectively). The surfactants of this example (15) prepared using the 2nd order of addition as described in Example 9 were not as potent as the corresponding surfactants described in Example 14 prepared using the 4th order of addition as described in Example 9.

EXAMPLE 16

Effect of Changing the Number of $D^0$ and $D''$ units in Surfactants Synthesized Using the 4th Order of Addition and Cyclic $D_5$ Pendant Groups The surfactants described in this example all contain cyclic $D_5$ pendant groups and were all synthesized in the manner described in Example 8 except for using the 4th order of addition described in Example 9 and the variations indicated in the following table:

TABLE XVII

| Surfactant # | PHSP # | g | Polyether BAMW | g | xs g | Pendant Si Group type | g | CPA ppm | Rxn. Temp °C. | Addition Order | $MD^0{}_xD''{}_yM$ x | y |
|---|---|---|---|---|---|---|---|---|---|---|---|---|
| 201 | 12 | 4.88 | 2342 | 51.7 | 15.5 | 4 | 18.4 | 100 | 90 | 4 | 12.0 | 5.5 |
| 202 | 12 | 4.63 | 2342 | 53.6 | 16.1 | 4 | 16.8 | 100 | 90 | 4 | 11.5 | 6.0 |
| 203 | 12 | 4.41 | 2342 | 55.3 | 16.6 | 4 | 15.3 | 100 | 90 | 4 | 11.0 | 6.5 |
| 204 | 15 | 5.01 | 2342 | 51.6 | 15.5 | 4 | 18.4 | 100 | 90 | 4 | 9.8 | 4.5 |
| 205 | 15 | 4.71 | 2342 | 53.9 | 16.2 | 4 | 16.4 | 100 | 90 | 4 | 9.3 | 5.0 |
| 206 | 15 | 4.44 | 2342 | 55.9 | 16.8 | 4 | 14.6 | 100 | 90 | 4 | 8.8 | 5.5 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE XVIII

| Surfactant # | Surfactant Concentration (pphp) | Height of Foam Rise (cm) at 25° C. | Airflow (scfm) | Top Collapse (cm) |
|---|---|---|---|---|
| 201 | 0.45 | C | — | — |
| 201 | 0.50 | C | — | — |
| 201 | 0.85 | 35.05 | 6.00 | −3.00 |
| 201 | 0.95 | 36.80 | 5.00 | −0.80 |
| 201 | 1.05 | 37.10 | 5.00 | −0.30 |
| 201 | 1.50 | 38.80 | 5.00 | −0.51 |
| 201 | 2.85 | 38.55 | 2.10 | −0.76 |
| 202 | 0.45 | C | — | — |
| 202 | 0.50 | C | — | — |
| 202 | 0.65 | 33.80 | 3.50 | −2.00 |
| 202 | 0.75 | 35.80 | 4.00 | −0.80 |
| 202 | 0.85 | 37.85 | 5.75 | −1.30 |

TABLE XVIII-continued

| Surfactant # | Surfactant Concentration (pphp) | Height of Foam Rise (cm) at 25° C. | Airflow (scfm) | Top Collapse (cm) |
|---|---|---|---|---|
| 202 | 1.50 | 39.10 | 4.00 | −0.51 |
| 202 | 2.85 | 39.35 | 1.85 | −0.25 |
| 203 | 0.45 | C | — | — |
| 203 | 0.50 | C | — | — |
| 203 | 0.65 | 34.30 | 2.60 | −1.50 |
| 203 | 0.75 | 36.60 | 3.50 | −1.30 |
| 203 | 0.85 | 38.05 | 4.50 | −1.30 |
| 203 | 1.50 | 39.10 | 4.00 | −0.76 |
| 203 | 2.85 | 39.65 | 2.30 | −0.25 |
| 204 | 0.45 | C | — | — |
| 204 | 0.50 | 30.05 | — | −7.37 |
| 204 | 0.65 | 36.80 | 5.00 | −0.80 |
| 204 | 0.75 | 37.30 | 5.00 | −0.80 |
| 204 | 0.85 | 38.55 | 6.00 | −1.30 |
| 204 | 1.50 | 39.40 | 4.75 | −0.51 |
| 204 | 2.85 | 39.65 | 2.10 | −0.25 |
| 205 | 0.45 | 32.20 | — | −6.40 |
| 205 | 0.50 | 35.65 | — | −2.29 |
| 205 | 0.55 | 35.50 | 5.00 | −1.50 |
| 205 | 0.60 | 36.30 | 5.00 | −1.30 |
| 205 | 0.85 | 39.05 | 6.00 | −1.00 |
| 205 | 1.50 | 39.10 | 5.00 | −0.76 |
| 205 | 2.85 | 39.65 | 3.00 | −0.25 |
| 206 | 0.45 | 27.90 | — | −10.70 |
| 206 | 0.50 | 31.05 | — | −7.11 |
| 206 | 0.65 | 36.60 | 4.00 | −1.00 |
| 206 | 0.75 | 37.10 | 4.00 | −0.80 |
| 206 | 0.85 | 39.05 | 4.25 | −1.00 |
| 206 | 1.50 | 39.60 | 3.50 | −0.76 |
| 206 | 2.85 | 39.85 | 2.65 | −0.51 |

Where C indicates that the foam collapsed.

These results demonstrate the effect of changes in the number of $D^0$ and $D''$ units in the surfactants on the performance of the surfactant in flexible urethane foam. These surfactants showed potencies between 0.58 and 0.88 parts and much flatter breathability profiles than Controls A and B.

EXAMPLE 17

Effect of Changing the Shape of the Silicone Pendant Groups in $MD^0{}_xD''{}_yM$ Surfactants Six surfactants were synthesized using the procedure described in example 9. the type of siloxane pendant group was varied as shown in the following table:

TABLE XIX

| Surfactant # | PHSP # | PHSP g | Polyether BAMW | Polyether g | Polyether xs g | Pendant Si Group type | Pendant Si Group g | CPA ppm | Rxn. Temp °C. | Addition Order | $MD^0{}_xD''{}_yM$ x | $MD^0{}_xD''{}_yM$ y |
|---|---|---|---|---|---|---|---|---|---|---|---|---|
| 49 | 1 | 5.46 | 2342 | 51.7 | 15.5 | 1 | 17.8 | 100 | 90 | 4 | 14.4 | 5.5 |
| 83 | 1 | 5.46 | 2342 | 51.7 | 15.5 | 2 | 18.6 | 100 | 90 | 4 | 14.4 | 5.5 |
| 88 | 1 | 5.46 | 2342 | 51.7 | 15.5 | 3 | 18.6 | 100 | 90 | 4 | 14.4 | 5.5 |
| 201 | 12 | 4.88 | 2342 | 51.7 | 15.5 | 4 | 18.4 | 100 | 90 | 4 | 12.0 | 5.5 |
| 65 | 6 | 5.36 | 2342 | 51.8 | 15.5 | 1 | 17.9 | 25 | 90 | 4 | 17.3 | 6.6 |
| 84 | 6 | 5.36 | 2342 | 51.7 | 15.5 | 2 | 18.7 | 100 | 90 | 4 | 17.3 | 6.3 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluation of the surfactants are set forth in the following table:

TABLE XX

| Surfactant # | Surfactant Concentration (pphp) | Height of Foam Rise (cm) at 25° C. | Airflow (scfm) | Top Collapse (cm) |
|---|---|---|---|---|
| 49 | 0.45 | 32.50 | — | — |
| 49 | 0.50 | 36.91 | 3.50 | −1.02 |
| 49 | 0.55 | 37.10 | 4.50 | −1.27 |
| 49 | 0.65 | 38.10 | 5.00 | −1.02 |
| 49 | 0.75 | 38.70 | 6.00 | −0.76 |
| 49 | 1.50 | 38.71 | 4.75 | −0.51 |
| 49 | 2.85 | 39.21 | 3.25 | −0.25 |
| 49 | 5.00 | 39.51 | 3.35 | 0.00 |
| 83 | 2.85 | C | — | — |
| 83 | 5.00 | C | — | — |
| 88 | 0.85 | C | — | — |
| 88 | 0.90 | C | — | — |
| 88 | 0.95 | C | — | — |
| 88 | 1.00 | 36.50 | 5.75 | −2.03 |
| 88 | 1.25 | 37.80 | 6.00 | −1.78 |
| 88 | 2.85 | 38.10 | 2.60 | −1.02 |
| 88 | 5.00 | 37.80 | 2.95 | −0.76 |
| 201 | 0.45 | C | — | — |
| 201 | 0.50 | C | — | — |
| 201 | 0.85 | 35.05 | 6.00 | −3.00 |
| 201 | 0.95 | 36.80 | 5.00 | −0.80 |
| 201 | 1.05 | 37.10 | 5.00 | −0.30 |
| 201 | 1.50 | 38.80 | 5.00 | −0.51 |
| 201 | 2.85 | 38.55 | 2.10 | −0.76 |
| 65 | 0.35 | C | — | — |
| 65 | 0.40 | 30.75 | — | −5.84 |
| 65 | 0.45 | 35.85 | 4.00 | −2.00 |
| 65 | 0.65 | 37.35 | 4.00 | −0.51 |
| 65 | 0.85 | 37.85 | 3.75 | −0.51 |
| 65 | 1.25 | 38.30 | 3.50 | −0.25 |
| 65 | 2.85 | 38.80 | 2.80 | 0.00 |
| 65 | 5.00 | 38.60 | 3.00 | 0.00 |
| 84 | 1.25 | C | — | — |
| 84 | 5.00 | C | — | — |

Where C indicates that the foam collapsed.

This foam data demonstrate that use of cyclic $D_4$ cyclic $D_5$ siloxane pendants give superior surfactant performance compared to either linear $MD_2M^*$ or branched $M_3T^*$ siloxane pendants. It should be noted that Surfactant 201 contains the same total number of siloxanes as Surfactants 49, 83 and 88. Similiarly Surfactant 65 contains the same number of siloxanes as Surfactant 84.

EXAMPLE 18

Effect of Changing the Number of D Units in the Siloxane Backbone in $MD^0{}_xD''{}_{5.5}D_zM$ Surfactants Without Changing the Total Number of D Units in The Surfactant Three surfactants were synthesized using the procedure described in Example 8 with the modification of using the 4th order of addition as described in Example 9. these surfactants each contained the same total number of siloxane units but varied in the number of D units in the siloxane backbone.

polyether units but the blend average molecular weight of the polyether pendants was varied.

TABLE XXI

| Surfactant # | PHSP # | g | Polyether BAMW | g | xs g | Pendant Si Group type | g | CPA ppm | Rxn. Temp °C. | Addition Order | $MD°_xD''_5D_zM$ x | z |
|---|---|---|---|---|---|---|---|---|---|---|---|---|
| 49 | 1 | 5.46 | 2342 | 51.7 | 15.5 | 1 | 17.8 | 100 | 90 | 4 | 14.4 | 0.0 |
| 301 | | | (see Example 6 for details) | | | | | 100 | 90 | 4 | 11.4 | 15.0 |
| 302 | | | (see Example 7 for details) | | | | | 100 | 90 | 4 | 8.4 | 30.0 | where:
the "type of Si pendant" is derived from:
(1) $D_3D^*$ vinyl
(2) $M_3T^*$ vinyl
(3) $MD_2M^*$ vinyl
(4) $D_4D^*$ vinyl

TABLE XXIII

| Surfactant # | PHSP # | g | Polyether BAMW | g | xs g | Pendant Si Group type | g | CPA ppm | Rxn. Temp °C. | Addition Order |
|---|---|---|---|---|---|---|---|---|---|---|
| 49 | 1 | 5.46 | 2342 | 51.7 | 15.5 | 1 | 17.8 | 100 | 90 | 4 |
| 50 | 1 | 5.14 | 2550 | 53.0 | 15.9 | 1 | 16.8 | 100 | 90 | 4 |
| 51 | 1 | 5.00 | 2650 | 53.6 | 16.1 | 1 | 16.4 | 100 | 90 | 4 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE XXII

| Surfactant # | Surfactant Concentration (pphp) | Height of Foam Rise (cm) at 25° C. | Airflow (scfm) | Top Collapse (cm) |
|---|---|---|---|---|
| 49 | 0.45 | 32.50 | — | — |
| 49 | 0.50 | 36.91 | 3.50 | −1.02 |
| 49 | 0.55 | 37.10 | 4.50 | −1.27 |
| 49 | 0.65 | 38.10 | 5.00 | −1.02 |
| 49 | 0.75 | 38.70 | 6.00 | −0.76 |
| 49 | 1.50 | 38.71 | 4.75 | −0.51 |
| 49 | 2.85 | 39.21 | 3.25 | −0.25 |
| 49 | 5.00 | 39.51 | 3.35 | 0.00 |
| 301 | 0.35 | C | — | — |
| 301 | 0.40 | C | — | — |
| 301 | 0.45 | 33.30 | 4.75 | −3.56 |
| 301 | 0.85 | 36.80 | 5.00 | −1.02 |
| 301 | 1.25 | 37.30 | 4.50 | −0.76 |
| 301 | 2.85 | 37.60 | 3.50 | −0.51 |
| 301 | 5.00 | 37.90 | 2.90 | −0.25 |
| 302 | 0.45 | 33.75 | 4.50 | −3.30 |
| 302 | 0.85 | 37.85 | 4.25 | −0.76 |
| 302 | 1.25 | 38.35 | 4.00 | −0.51 |
| 302 | 2.85 | 38.35 | 3.50 | −0.51 |
| 302 | 5.00 | 38.65 | 3.50 | −0.51 |

Where C indicates that the foam collapsed.

This example shows that Surfactants 301 and 302 give foams with even flatter breathability profiles than those for Surfactants 49 without any lose in potency. This is highly desirable in a flexible foam surfactant.

EXAMPLE 19

Effect of Changing the Blend Average Molecular Weight of the Polyether Pendant Group in $MD°_{14.4}D''_{5.5}M$ Surfactants Prepared Using the 4th Order of Addition Procedure Three surfactants were synthesized using the procedure described in Example 8 with the modification of using the 4th order of addition as described in Example 9 except as shown in the following Table. these surfactants each contained the same number of siloxane and The results of the foam evaluations of the surfactants are set forth in the following table:

TABLE XXIV

| Surfactant # | Surfactant Concentration (pphp) | Height of Foam Rise (cm) at 25° C. | Airflow (scfm) | Top Collapse (cm) |
|---|---|---|---|---|
| 49 | 0.45 | 32.50 | — | — |
| 49 | 0.50 | 36.91 | 3.50 | −1.02 |
| 49 | 0.55 | 37.10 | 4.50 | −1.27 |
| 49 | 0.65 | 38.10 | 5.00 | −1.02 |
| 49 | 0.75 | 38.70 | 6.00 | −0.76 |
| 49 | 1.50 | 38.71 | 4.75 | −0.51 |
| 49 | 2.85 | 39.21 | 3.25 | −0.25 |
| 49 | 5.00 | 39.51 | 3.35 | 0.00 |
| 50 | 0.45 | 27.70 | — | −9.40 |
| 50 | 0.50 | 32.85 | — | −5.08 |
| 50 | 0.55 | 36.10 | 3.50 | −1.52 |
| 50 | 0.65 | 37.40 | 4.50 | −1.27 |
| 50 | 0.75 | 38.40 | 5.50 | −0.76 |
| 50 | 0.85 | 37.30 | 6.25 | −0.76 |
| 50 | 1.50 | 37.80 | 5.25 | −0.25 |
| 50 | 2.85 | 39.51 | 3.00 | −0.25 |
| 50 | 5.00 | 39.51 | 2.95 | 0.00 |
| 51 | 0.45 | 30.00 | — | −6.10 |
| 51 | 0.50 | 31.85 | — | −5.59 |
| 51 | 0.55 | 35.10 | — | −3.05 |
| 51 | 0.65 | 37.90 | 5.00 | −1.27 |
| 51 | 0.75 | 38.40 | 5.00 | −0.76 |
| 51 | 0.85 | 38.10 | 5.50 | −0.51 |
| 51 | 1.50 | 39.75 | 4.75 | −0.51 |
| 51 | 2.85 | 39.75 | 2.85 | −0.25 |
| 51 | 5.00 | 39.75 | 3.25 | 0.00 |
| 52 | 0.45 | C | — | — |
| 52 | 0.50 | 29.05 | — | −8.38 |
| 52 | 0.55 | 32.80 | — | −5.08 |
| 52 | 0.65 | 37.60 | 3.50 | −1.02 |
| 52 | 0.75 | 38.10 | 3.50 | −1.02 |
| 52 | 0.85 | 38.80 | 3.25 | −0.76 |
| 52 | 1.25 | 40.10 | 3.50 | −0.51 |
| 52 | 1.50 | 39.60 | 3.00 | −0.51 |
| 52 | 2.85 | 40.10 | 3.00 | 0.00 |

Where C indicates that the foam collapsed.

This example shows that increasing the blend average molecular weight of the polymer blend from 2341 (Surfactant 49) to 2550 (Surfactant 51) gave a slight decrease in surfactant potency and a slight increase in the flatness breathability profile.

EXAMPLE 20

Effect of Changing the Blend Average Molecular Weight of the Polyether Pendant Group in $MD^0{}_{14.4}D''{}_{5.5}M$ Surfactants Prepared Using the 2nd Order of Addition Procedure

TABLE XXV

| Surfactant # | PHSP # | PHSP g | Polyether BAMW | Polyether g | Polyether xs g | Pendant Si Group type | Pendant Si Group g | CPA ppm | Rxn. Temp °C. | Addition Order |
|---|---|---|---|---|---|---|---|---|---|---|
| 42 | 1 | 5.46 | 2342 | 51.7 | 15.5 | 1 | 17.8 | 100 | 75 | 2 |
| 46 | 1 | 5.29 | 2450 | 52.4 | 15.7 | 1 | 17.3 | 100 | 90 | 2 |
| 47 | 1 | 5.14 | 2550 | 53.0 | 15.9 | 1 | 16.8 | 100 | 90 | 2 |
| 48 | 1 | 5.00 | 2650 | 53.6 | 16.1 | 1 | 16.4 | 100 | 90 | 2 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the table below:

TABLE XXVI

| Surfactant # | Surfactant Concentration (pphp) | Height of Foam Rise (cm) at 25° C. | Airflow (scfm) | Top Collapse (cm) |
|---|---|---|---|---|
| 42 | 0.45 | 28.90 | — | — |
| 42 | 0.85 | 34.50 | 4.25 | −3.30 |
| 42 | 1.25 | 35.30 | 4.00 | −2.30 |
| 42 | 2.85 | 34.55 | 5.50 | −2.80 |
| 46 | 0.45 | 26.40 | — | −10.16 |
| 46 | 0.85 | 32.20 | 5.00 | −4.57 |
| 46 | 1.25 | 33.50 | 5.50 | −3.30 |
| 46 | 1.50 | 34.00 | 6.00 | −3.30 |
| 47 | 0.45 | C | — | — |
| 47 | 0.85 | 33.30 | 5.00 | −3.56 |
| 47 | 1.25 | 34.50 | 4.75 | −2.54 |
| 47 | 1.50 | 34.30 | 5.00 | −2.79 |
| 48 | 0.45 | 23.60 | — | −12.45 |
| 48 | 0.85 | 33.50 | 5.00 | −3.56 |
| 48 | 1.25 | 34.00 | 4.50 | −3.05 |
| 48 | 1.50 | 34.30 | 5.00 | −3.05 | where C indicates that the foam collapsed.

This example shows that increasing the blend average molecular weight of the polyether blend from 2341 (Surfactant 42) to 2450 (Surfactant 46) to 2550 (Surfactant 47) to 2650 (Surfactant 48) gave a slight decrease in surfactant potency and a slight increase in the flatness of the breathability profile.

EXAMPLE 21

Effect of Changing the Blend Average Molecular Weight of the Polyether Pendant Group in $MD^0{}_{14.4}D''{}_{5.5}M$ Surfactants Prepared Using the 1st Order of Addition Procedure Four surfactants were synthesized using the procedure described in Example 8 with the modification of using the 1st order of addition as described in Example 9 except as shown in the following table. These surfactants each contained the same number of siloxane and polyether units but the blend average molecular weight of the polyether pendants was varied.

TABLE XXVII

| Surfactant # | PHSP # | PHSP g | Polyether BAMW | Polyether g | Polyether xs g | Pendant Si Group type | Pendant Si Group g | CPA ppm | Rxn. Temp °C. | Addition Order |
|---|---|---|---|---|---|---|---|---|---|---|
| 24 | 1 | 5.46 | 2342 | 51.7 | 15.5 | 1 | 17.8 | 120 | 90 | 1 |
| 25 | 1 | 5.29 | 2450 | 52.4 | 15.7 | 1 | 17.3 | 100 | 90 | 1 |
| 26 | 1 | 5.14 | 2550 | 53.0 | 15.9 | 1 | 16.8 | 100 | 90 | 1 |
| 27 | 1 | 5.00 | 2650 | 53.6 | 16.1 | 1 | 16.4 | 100 | 90 | 1 | where:
the "type of Si pendant" is derived from:
(1) $D_3D^*$ vinyl
(2) $M_3T^*$ vinyl
(3) $MD_2M^*$ vinyl
(4) $D_4D^*$ vinyl The results of the foam evaluations of the surfactants are set forth in the following table:

TABLE XVIII

| Surfactant # | Surfactant Concentration (pphp) | Height of Foam Rise (cm) at 25° C. | Airflow (scfm) | Top Collapse (cm) |
|---|---|---|---|---|
| 24 | 1.25 | C | — | — |
| 25 | 1.25 | C | — | — |
| 26 | 1.25 | C | — | — |
| 26 | 5.00 | C | — | — |
| 27 | 1.25 | C | — | — |
| 27 | 5.00 | C | — | — |

Where C indicates that the foam collapsed.

None of the surfactants in this Example gave stable foam in the test formulation so the effect of changing the blend average molecular weight of the polyether blend could not be established.

Although the invention has been illustrated by the preceding examples it is not to be construed as being limited to the materials employed therein, but rather, the invention relates to the generic area as hereinbefore disclosed. Various modifications and embodiments thereof can be made without departing from the spirit or scope thereof.

What is claimed:

1. A process for the preparation of silicone surfactants comprised of siloxane-polyether polymers having a plurality of pendant cyclic siloxane groups attached to the siloxane backbone of said polymers through Si—$CH_2$—$CH_2$—Si linkages, said process comprising the steps of:
   (a) forming a mixture, in an inert medium and under an inert atmosphere, of a vinylpolymethyl cyclic polysiloxane compound and a polyhydridosiloxane polymer of the formulas:

$MD'_xD_yM$ wherein:
   M represents $Me_3SiO_{1/2}$,
   D' represents $MeSi(H)O$,
   D represents $Me_2SiO$,
   x has a value of 2 to 200, and
   y has a value of 0 to 200;
   (b) heating the mixture to a temperature of from about 50° C. to about 120° C.;
   (c) contacting the mixture with an catalytic amount of a hydrosilation catalyst;
   (d) contacting the mixture with an allyl polyether fluid having a blend average molecular weight of from about 1000 to about 4000; and
   (e) after most of the SiH has reacted, adding an excess of the polyether.

2. The process of claim 1 wherein the allyl polyether has a blend average molecular weight of from about 1000 to about 2700.

3. The process of claim 1 wherein the mixture is heated at a temperature of from bout 65° C. to about 95° C.

4. The process of claim 1 wherein the cyclic polysiloxane compound is vinylheptamethylcyclotetrasiloxane.

5. The process of claim 1 wherein the cyclic polysiloxane compound is vinylnonamethylcyclopentasiloxane.

6. The process of claim 1 wherein the allyl polyether is terminated with a member selected from the group consisting of hydroxy, an alkoxy group having 1 to 4 carbon atoms, and an acyloxy group of a lower aliphatic carboxylic acid.

7. The process of claim 1 wherein the allyl polyether bears a terminal acetoxy group.

8. The process of claim 1 wherein the allyl polyether is a polyoxyalkylene polyether.

9. The process of claim 8 wherein the allyl polyether is a polyoxyethylene ether.

10. The process of claim 8 wherein the allyl polyether is a poly(oxyethyleneoxypropylene) ether.

11. The process of claim 8 wherein the allyl polyether is a polyoxypropylene ether.

12. The process of claim 1 wherein said hydrosilation catalyst comprises platinum.

13. The process of claim 12 wherein the hydrosilation catalyst is chloroplatinic acid.

14. A process for preparing a polyurethane foam which comprises reacting (a) a polyether containing at least two hydroxyl groups per molecule, (b) an organic polyisocyanate, (c) a catalyst for the reaction of (a) and (b) to produce a polyurethane, (d) a blowing agent and (e) a silicone surfactant prepared by the process of claim 1.

15. A process for preparing a polyurethane foam, which process comprises reacting (a) a polyether containing at least two hydroxyl groups per molecule, (b) an organic polyisocyanate, (c) a catalyst for the reaction of (a) and (b) to produce a polyurethane, (d) a blowing agent and (e) a silicone surfactant having one of the formulae $MD_aD^o{}_bD''{}_cM$ and $MD^o{}_bD''{}_cM$ wherein:
M represents $Me_3SiO_{1/2}$,
D represents $Me_2SiO$,
$D^o$ represents $$MeSi(O)CH_2CH_2Si(Me)O{-}(Me_2SiO)_{x'}$$

where $x = 2$ to 4,
D" represents $MeSi(O)CH_2CH_2CH_2$-O-Polyether, and in which a has a value of from 0 to 200, b has a value of from 1 to 200 and c has a value of from 1 to 200.

16. A polyurethane foam prepared by the process of claim 15.

17. A shaped polyurethane foam article prepared by the process of 15.

* * * * *